(12) United States Patent
Matyjaszewski et al.

(10) Patent No.: US 8,252,880 B2
(45) Date of Patent: Aug. 28, 2012

(54) ATOM TRANSFER DISPERSION POLYMERIZATION

(75) Inventors: Krzysztof Matyjaszewski, Pittsburgh, PA (US); Ke Min, Berkeley, CA (US); James Spanswick, Wheaton, IL (US)

(73) Assignee: Carnegie Mellon University, Pittsburgh, PA (US)

( * ) Notice: Subject to any disclaimer, the term of this patent is extended or adjusted under 35 U.S.C. 154(b) by 113 days.

(21) Appl. No.: 12/451,581

(22) PCT Filed: May 23, 2008

(86) PCT No.: PCT/US2008/064710
§ 371 (c)(1),
(2), (4) Date: Jul. 6, 2010

(87) PCT Pub. No.: WO2008/148000
PCT Pub. Date: Dec. 4, 2008

(65) Prior Publication Data
US 2010/0273906 A1 Oct. 28, 2010

Related U.S. Application Data

(60) Provisional application No. 60/931,472, filed on May 23, 2007.

(51) Int. Cl.
*C08F 4/00* (2006.01)
*C08F 2/00* (2006.01)
*C08F 4/28* (2006.01)
*C08F 210/00* (2006.01)
*C08F 36/00* (2006.01)

(52) U.S. Cl. ........ 526/336; 521/150; 526/222; 526/227; 526/348; 526/90

(58) Field of Classification Search .................... 526/90, 526/222, 227, 336, 348; 521/150
See application file for complete search history.

(56) References Cited

U.S. PATENT DOCUMENTS

| | | |
|---|---|---|
| 3,037,004 A | 5/1962 | Simone et al. |
| 3,096,312 A | 7/1963 | Henry |
| 3,183,217 A | 5/1965 | Serniuk et al. |
| 3,350,374 A | 10/1967 | Fetscher et al. |
| 3,397,186 A | 8/1968 | Edward et al. |
| 3,862,978 A | 1/1975 | Decker et al. |
| 3,959,225 A | 5/1976 | Kuntz |
| 3,963,491 A | 6/1976 | Marsh |

(Continued)

FOREIGN PATENT DOCUMENTS
CA 2209061 2/1998
(Continued)

OTHER PUBLICATIONS

Acar, et al., Macromolecules 2000, 33, 7700-7706.
(Continued)

*Primary Examiner* — William Cheung
(74) *Attorney, Agent, or Firm* — K&L Gates LLP

(57) ABSTRACT

The present disclosure describes a two-step batch dispersion polymerization process for the preparation of substantially uniformed-sized functional (co)polymer particles. The first step of the process includes polymerizing at least one first radically (co)polymerizable monomer by a free radical polymerization process to form a (co)polymer in a stable colloidal dispersion and the second step includes polymerizing the at first radically (co)polymerizable monomer or an additional radically (co)polymerizable monomer in the stable colloidal dispersion by a living/controlled radical (co)polymerization process.

27 Claims, 4 Drawing Sheets

U.S. PATENT DOCUMENTS

| | | |
|---|---|---|
| 4,007,165 A | 2/1977 | MacLeay et al. |
| 4,073,870 A | 2/1978 | Saji et al. |
| 4,145,586 A | 3/1979 | Swann |
| 4,374,751 A | 2/1983 | Dudgeon |
| 4,384,093 A | 5/1983 | Culbertson et al. |
| 4,581,429 A | 4/1986 | Solomon et al. |
| 4,728,706 A | 3/1988 | Farnham et al. |
| 4,806,605 A | 2/1989 | Hertler |
| 4,940,648 A | 7/1990 | Geiger |
| 4,940,760 A | 7/1990 | Boettcher et al. |
| 4,954,416 A | 9/1990 | Wright et al. |
| 4,978,498 A | 12/1990 | Yoshihiro et al. |
| 5,026,813 A | 6/1991 | Meder |
| 5,089,135 A | 2/1992 | Yoneyama et al. |
| 5,102,967 A | 4/1992 | Meder |
| 5,169,914 A | 12/1992 | Kaszas et al. |
| 5,210,109 A | 5/1993 | Tateosian et al. |
| 5,212,043 A | 5/1993 | Yamamoto et al. |
| 5,248,746 A | 9/1993 | Shimokawa et al. |
| 5,254,651 A | 10/1993 | Alexanian et al. |
| 5,281,681 A | 1/1994 | Austin |
| 5,294,678 A | 3/1994 | Tse et al. |
| 5,312,871 A | 5/1994 | Mardare et al. |
| 5,322,912 A | 6/1994 | Georges et al. |
| 5,324,879 A | 6/1994 | Hawthorne |
| 5,331,088 A | 7/1994 | Meister et al. |
| 5,401,804 A | 3/1995 | Georges et al. |
| 5,405,913 A | 4/1995 | Harwood et al. |
| 5,451,647 A | 9/1995 | Faust et al. |
| 5,470,928 A | 11/1995 | Harwood et al. |
| 5,506,312 A | 4/1996 | Arjunan |
| 5,508,353 A | 4/1996 | Liu et al. |
| 5,510,212 A | 4/1996 | Delnick et al. |
| 5,510,307 A | 4/1996 | Narayanan et al. |
| 5,558,954 A | 9/1996 | Morrison |
| 5,610,250 A | 3/1997 | Veregin et al. |
| 5,656,708 A | 8/1997 | Meister |
| 5,668,188 A | 9/1997 | Whinnery et al. |
| 5,700,844 A | 12/1997 | Liao et al. |
| 5,705,577 A | 1/1998 | Rossi et al. |
| 5,708,102 A | 1/1998 | Fryd et al. |
| 5,763,548 A | 6/1998 | Matyjaszewski et al. |
| 5,767,210 A | 6/1998 | Lecomte et al. |
| 5,773,538 A | 6/1998 | Feiring |
| 5,789,487 A | 8/1998 | Matyjaszewski et al. |
| 5,807,937 A | 9/1998 | Matyjaszewski et al. |
| 5,811,500 A | 9/1998 | Dubois et al. |
| 5,833,320 A | 11/1998 | Kaneko et al. |
| 5,854,364 A | 12/1998 | Senninger et al. |
| 5,886,118 A | 3/1999 | Percec |
| 5,891,971 A | 4/1999 | Keoshkerian et al. |
| 5,910,549 A | 6/1999 | Matyjaszewski et al. |
| 5,945,491 A | 8/1999 | Matyjaszewski et al. |
| 5,998,537 A | 12/1999 | Good et al. |
| 6,054,507 A | 4/2000 | Funaki et al. |
| 6,057,042 A | 5/2000 | Shimotsu |
| 6,083,524 A | 7/2000 | Sawhney et al. |
| 6,111,022 A | 8/2000 | Matyjaszewski et al. |
| 6,114,448 A | 9/2000 | Derbes |
| 6,114,482 A | 9/2000 | Senninger et al. |
| 6,121,371 A | 9/2000 | Matyjaszewski et al. |
| 6,124,411 A | 9/2000 | Matyjaszewski et al. |
| 6,126,919 A | 10/2000 | Stefely et al. |
| 6,143,848 A | 11/2000 | Lee et al. |
| 6,162,882 A | 12/2000 | Matyjaszewski et al. |
| 6,191,197 B1 | 2/2001 | Wang et al. |
| 6,254,854 B1 | 7/2001 | Edwards et al. |
| 6,255,448 B1 | 7/2001 | Grimaldi et al. |
| 6,288,186 B1 | 9/2001 | Matyjaszewski et al. |
| 6,310,149 B1 | 10/2001 | Haddleton |
| 6,326,455 B2 | 12/2001 | Vassiliou et al. |
| 6,407,187 B1 | 6/2002 | Matyjaszewski et al. |
| 6,512,060 B1 | 1/2003 | Matyjaszewski et al. |
| 6,534,610 B1 | 3/2003 | Wilson et al. |
| 6,538,091 B1 | 3/2003 | Matyjaszewski et al. |
| 6,541,580 B1 | 4/2003 | Matyjaszewski et al. |
| 6,545,095 B1 | 4/2003 | Solomon et al. |
| 6,565,763 B1 | 5/2003 | Asakawa et al. |
| 6,592,991 B1 | 7/2003 | Wiesner et al. |
| 6,598,721 B2 | 7/2003 | Schmidl |
| 6,624,262 B2 | 9/2003 | Matyjaszewski et al. |
| 6,624,263 B2 | 9/2003 | Matyjaszewski et al. |
| 6,627,314 B2 | 9/2003 | Matyjaszewski et al. |
| 6,670,299 B1 | 12/2003 | Marks et al. |
| 6,672,717 B2 | 1/2004 | Smith |
| 6,686,432 B2 | 2/2004 | Coca et al. |
| 6,692,914 B1 | 2/2004 | Klaerner et al. |
| 6,737,488 B2 | 5/2004 | Vanhoorne et al. |
| 6,759,491 B2 | 7/2004 | Matyjaszewski et al. |
| 6,784,247 B2 | 8/2004 | Rechenberg et al. |
| 6,784,248 B2 | 8/2004 | Coca et al. |
| 6,790,919 B2 | 9/2004 | Matyjaszewski et al. |
| 6,828,025 B2 | 12/2004 | Ali et al. |
| 6,887,962 B2 | 5/2005 | Matyjaszewski et al. |
| 7,018,655 B2 | 3/2006 | Lele et al. |
| 7,019,082 B2 | 3/2006 | Matyjaszewski et al. |
| 7,037,992 B2 | 5/2006 | Wilson et al. |
| 7,049,373 B2 | 5/2006 | Matyjaszewski et al. |
| 7,056,455 B2 | 6/2006 | Matyjaszewski et al. |
| 7,064,151 B1 | 6/2006 | Berge et al. |
| 7,064,166 B2 | 6/2006 | Matyjaszewski et al. |
| 7,105,579 B2 | 9/2006 | Adam et al. |
| 7,125,938 B2 | 10/2006 | Matyjaszewski et al. |
| 7,157,530 B2 | 1/2007 | Matyjaszewski et al. |
| 7,332,550 B2 | 2/2008 | Matyjaszewski et al. |
| 7,572,874 B2 | 8/2009 | Matyjaszewski et al. |
| 7,678,869 B2 | 3/2010 | Matyjaszewski et al. |
| 7,795,355 B2 | 9/2010 | Matyjaszewski et al. |
| 2003/0236361 A1 | 12/2003 | Yeager et al. |
| 2004/0044152 A1 | 3/2004 | Matyjaszewski et al. |
| 2004/0171779 A1 | 9/2004 | Matyjaszewski et al. |
| 2004/0204556 A1 | 10/2004 | Matyjaszewski et al. |
| 2005/0090632 A1 | 4/2005 | Matyjaszewski et al. |
| 2006/0258826 A1 | 11/2006 | Matyjaszewski et al. |
| 2007/0106012 A1 | 5/2007 | Matyjaszewski et al. |
| 2007/0155926 A1 | 7/2007 | Matyjaszewski et al. |
| 2007/0244265 A1 | 10/2007 | Matyjaszewski et al. |
| 2007/0276101 A1 | 11/2007 | Matyjaszewski et al. |
| 2009/0012227 A1* | 1/2009 | Wang et al. .................. 524/501 |
| 2009/0171024 A1 | 7/2009 | Jakubowski et al. |
| 2009/0312505 A1 | 12/2009 | Matyjaszewski et al. |
| 2010/0143286 A1 | 6/2010 | Matyjaszewski et al. |
| 2011/0060107 A1 | 3/2011 | Matyjaszewski et al. |
| 2011/0218306 A1 | 9/2011 | Matyjaszewski et al. |

FOREIGN PATENT DOCUMENTS

| | | |
|---|---|---|
| CN | 1165828 A | 11/1997 |
| EP | 0265091 A1 | 4/1988 |
| EP | 0341012 A2 | 11/1989 |
| EP | 0434438 A | 6/1991 |
| EP | 0457916 A | 11/1991 |
| EP | 0789036 A1 | 8/1997 |
| EP | 0816385 A1 | 1/1998 |
| EP | 0824110 A1 | 2/1998 |
| EP | 0824111 A1 | 2/1998 |
| EP | 0826698 A1 | 3/1998 |
| EP | 0832902 A2 | 4/1998 |
| EP | 0870809 A2 | 10/1998 |
| EP | 0872493 A | 10/1998 |
| EP | 0879832 A1 | 11/1998 |
| EP | 1386935 A | 2/2004 |
| EP | 1469020 A | 10/2004 |
| EP | 1555273 A1 | 7/2005 |
| JP | 6322171 A | 11/1994 |
| WO | WO 88/00603 A3 | 1/1988 |
| WO | WO 94/13706 A | 6/1994 |
| WO | WO 97/18247 | 5/1997 |
| WO | WO 97/47661 A1 | 12/1997 |
| WO | WO 98/01480 | 1/1998 |
| WO | WO 98/06758 A1 | 2/1998 |
| WO | WO 98/20050 A2 | 5/1998 |
| WO | WO 99/28352 A | 6/1999 |
| WO | WO 00/47634 A1 | 8/2000 |
| WO | WO 00/56795 A1 | 9/2000 |
| WO | WO 00/75198 | 12/2000 |
| WO | WO 01/77197 A3 | 10/2001 |
| WO | WO 03/097107 A | 11/2003 |

| | | |
|---|---|---|
| WO | WO 2004/041972 A | 5/2004 |
| WO | WO 2004/060928 A | 7/2004 |
| WO | WO 2004/087777 A2 | 10/2004 |
| WO | WO 2005/056621 A1 | 6/2005 |
| WO | WO 2007/025086 A2 | 3/2007 |
| WO | WO 2007/025310 A1 | 3/2007 |
| WO | WO 2007/059350 A2 | 5/2007 |
| WO | WO 2008/009997 A1 | 7/2007 |
| WO | WO 2008/057163 A2 | 5/2008 |
| WO | WO 2008/148000 A1 | 12/2008 |
| WO | WO 2009/023353 A9 | 2/2009 |
| WO | WO 2009/111725 A1 | 9/2009 |

OTHER PUBLICATIONS

Anderegg, et al., Helv. Chim. Acta 1977, 60, 123.
Annenkov et al., Poly-C-vinyltetrazoles: A New Type of Polyacid, Journal of Polymer Science Part A: Polymer Chemistry, 1993, pp. 1903-1906, vol. 31(7).
Ashford, et al., "First example of the atom transfer radical polymerisation of an acidic monomer: direct synthesis of methacrylic acid copolymers in aqueius media", Chemical Communications—Chemcom, Royal Society of Chemistry, GB (1999), pp. 1285-1286.
Asscher et al., Chlorine-Activation by Redox-Transfer, Part IV, The Addition of Sulphonyl Chlorides to Vinylic Monomers and Other Olefins, Journal of the Chemical Society, 1964, pp. 4962-4971.
Bamford, Comprehensive Polymer Science (First Supplement), eds., Pergamon: Oxford vol. 3., p. 123 (1991).
Baumann, et al., Macromolecular Materials and Engineering (2000), 280/281, 1-6.
Bellus, Pure & Appl. Chem. 57, 1827 (1985).
Bledzki, et al., Makromol. Chem. 184, 745 (1983).
Braunecker, et al., Macromolecules 2005, 38, 4081.
Braunecker, et al., Organometal Chem. 2005, 690, 916.
Brittain et al., Makromol. Chem., Macromol. Symp. 67, pp. 373-386 (1993), "Termination Processes in Group Transfer Polymerization".
Buback, et al. (1995) Macromol. Chem. Phys. 196, 3267-80.
Buback, et al. (2002) Macromol. Chem. Phys. 203, 2570-2582.
Bywater, Makromol. Chem., Macromol. Symp. 67, pp. 339-350 (1993), "Group Transfer Polymerization—A Critical Overview".
Carnahan et al., Synthesis and Characterization of Poly(glycerol-succinic acid) Dendrimers, Macromolecules, 2001, pp. 7648-7655, vol. 34(22).
Carter et al., Polyimide Nanofoams From Phase-Separated Block Copolymers, Electrochemical Society Proceedings, 1997, pp. 32-43, vol. 97(8), Electrochemical Society, Pennington, NJ, US.
Caruso, Nanoengineering of Particle Surfaces—Adv. Mater. 2001, 13, No. 1, Jan. 5, 11-22—Wiley—VCH Verlag GmbH.D-69469 Weinheim, 2001.
Catala, et al., Macromolecules, 1995, 28, 8441.
Chemical Abstracts, vol. 85, 1976, pp. 20.
Chen et al., Pryolytic Behavior and In-Situ Paramagnetism of Star-like C60(CH3)x(PAN)xcopolymers, European Polymer Journal, 1998, pp. 421-429, vol. 34(3-4), Elsevier Science Ltd., Oxford, GB.
Coca et al., Polymerization of Acrylates by Atom Transfer Radical Polymerization. Homopolymerization of 2-Hydroxyethyl Acrylate, Journal of Polymer Science, Part A: Polymer Chemistry, 1998, pp. 1417-1424, vol. 36.
Cohen, et al., Inorg. Chem. 13, 2434 (1974).
Collman et al., "Clicking" Functionality onto Electrode Surfaces, Langmuir, 2004, pp. 1051-1053, vol. 20.
Curran, et al., Comprehensive Organic Synthesis, eds., Pergamon: Oxford vol. 4, p. 715 (1991).
Curran, et al., J. Am. Chem. Soc. 116, 4279 (1994).
Curran, et al., J. Org. Chem., 54, 3140 (1989).
Curran, Synthesis, 489 (1988).
Darkow et al., "Synthesis, Photomodification and Characterization of Homo- and Copolymers with 2,5-bisaryltetrazolyl Pendant Groups", Reactive and Functional Polymers, 1997, pp. 195-207, vol. 32(2).
Davies, "Reactions of L-ascorbic acid with transition metal complexes," Polyhedron, 1992, 11, 285-321.
De Vries, et al., "The Effect of Reducing Monosaccharides on the Atom Transfer Radical Polymerization of Butyl Methacrylate," Macromol. Chem. Phys., 2001, 202, 1645-1648.

Demko et al., A Click Chemistry Approach to Tetrazoles by Huisgen 1,3-Dipolar Cycloaddition: Synthesis of 5-Acyltetrazoles from Azides and Acyl Cyanides, Angewandte Chemie, International Edition, 2004, pp. 2113-2116, vol. 41(12).
Desmarquest, et al., Electrochim. Acta (1968), 13, 1109-1113.
Dreezen, et al., "Nano-Structured Polymer Blends: Phase Structure, Crystallisation Behaviour and Semi-Crystalline Morphology of Phase Separated Binary Blends of Poly(ethyleneoxide) and Poly(ether sulphone)", Polymer, Elsevier Science Publishers B.V., GB, vol. 41, No. 4, Feb. 2000, pp. 1395-1407.
Druliner, Macromolecules, 24, 6079 (1991).
Endo, et al., Macromolecules, 25, 5554 (1992).
Feng, "Synthesis and Free Radical Polymerization of 2-oxo-3-methylene-5-phenyl-1,4-dioxan". Chinese Journal of Polymer Science, 1993, 11, 2, pp. 153-157.
Fischer, et al., Acc. Chem. Res. 20, 200-206 (1987).
Fischer, H., Chem. Rev. 2001, 101, 3581-3610.
Frackowiak, et al., "Supercapacitor electrodes from multiwalled carbon nanotubes", Applied Physics Letters, 77, pp. 2421-2423 (2000).
Fukuda, et al, Chem. Letters, 1996, 4, 293.
Fukuda, et al., Macromolecules, 1996, 29, 3050.
Gabaston, et al., "Synthesis of water soluble homopolymers and block copolymers by living free-radical polymerization", Polymr Preprints (American Chemical Society, Division of Polymer Chemistry), 38(1), pp. 719-720 (1997).
Gaynor, et al., Polym. Prep. (Am. Chem. Soc. Polym. Chem. Div.), 36(1), 467 (1995).
Georges, et al., Macromolecules 1993, 26, 2987.
Georges, et al., Macromolecules 1994, 27, 7228.
Georges, et al., Macromolecules, 1993, 26, 5316.
Gilbert & Williams, Reactivity Ratios of Conjugated Dienes Copolymerized in Emulsion at 5°, J. Am. Chem. Soc. 74, (1952), pp. 4114-4118.
Gnanou et al., "Effect of Phenol and Derivatives on Atom Transfer Radical Polymerization in the Presence of Air," Journal Polymer Science, Part A: Polymer Chemistry, 2004, 42, 351-359.
Granel et al., Controlled Radical Polymerization of Methacrylic Monomers in the Presence of Bis(ortho-chelated) Arylnickel (II) Complex and Different Activated Alkyl Halides, Macromolecules, 1996, pp. 8576-8582, vol. 29(27).
Grayson et al., Convergent Dendrons and Dendrimers: From Synthesis to Applications, Chemical Reviews, 2001, pp. 3819-3867, vol. 101(12).
Greszta et al., Gradient Copolymers of Styrene and Acrylonitrille Via Atom Transfer Radical Polymerization, Polymer Preprints, 1997, pp. 709-710, vol. 38(1).
Greszta, et al., Macromolecules, 27, 638 (1994).
Gromada et al., Simultaneous Reverse and Normal Initiation in Atom Transfer Radical Polymerization, Macromolecules, 2001, pp. 7664-7671, 34(22).
Haddleton, et al., "Copper-mediated living radical polymerization utilizing biological and end group modified poly(ethylene-co-butylene) macroinitiators", ACS Symposium Series, 768, (Controlled/Living Radical Polymerization), pp. 182-196 (2000).
Hawker, "Molecular Weight Control by a Living Free Radical Polymerization Process", Journal American Chem. Society, 1994, vol. 116, pp. 11185-11186.
Hawker, et al., Macromolecules, 1996, 29, 2686.
Hayes, et al., J. Am. Chem. Soc. 110, 5533 (1988).
Hedrick et al., Dendrimer-like Star Block and Amphiphlic Copolymers by Combination of Ring Opening and Atom Transfer Radicat Polymerization. Macromolecules, 1998, 31, 8671-8705.
Helms et al., Dendronized Linear Polymers via "Click Chemistry", Journal of the American Chemical Society, 2004, pp. 15020-15021, vol. 126(46).
Heuts et al., "Atom transfer radical polymerization in the presence of a thiol: more evidence supporting radical intermediates," Macromol. Chem. Phys., 1999, 200, 1380-1385.
Hirao, et al., J. Synth. Org. Chem. (Japan), 52(3), 197 (1994).
Hirao, et al., Syn. Lett. 217 (1990).
Hong, et al., "Synthesis of water-soluble fluorine-containing block copolymers by atom transfer radical polymerization", 25(4), 302 (2001).

Hovestad, et al., Macromolecules 2000, 33, 4048-4052.
Ihre et al., Fast and Convenient Divergent Synthesis of Aliphatic Ester Dendrimers by Anhydride Coupling, Journal of the American Chemical Society, 2001, pp. 5908-5917, vol. 123(25).
Iqbal, et al., Chem. Rev. 94, 519 (1994).
Jakubowski et al., "Activators Regenerated by Electron Transfer for Atom Transfer Radical Polymerization of Styrene," Macromolecules, 2006, 39, 39-45.
J-F Lutz et al,. Synthesis and Properties of Copolymers with Tailored Sequence Distribution by Controlled/Living Radical Polymerization, in ACS Symposium Series, Advances in Controlled/living Radical Polymerizations, American Chemical Society Division of Polymer Chemistry, 2003, Chapter 19, pp. 268-282, vol. 854.
Jo et al., Effects of Various Copper Salts and Additives on Polymerization of Acrylonitrile by Atom Transfer Radical Polymerization, Polymer Preprints, 1997, pp. 699-700, vol. 38(1).
Jo et al., Polyacrylonitrile with Low Polydispersities by Atom Transfer Radical Polymerization, Polymer Preprints, 1997, pp. 697-698, vol. 38(1).
Kamigata, et al., Novel Perfluoroalkylation of Alkenes with Perfluoroalkanesulphonyl Chlorides Catalysed by a Ruthenium (II) Complex, Journal of the Chemical Society, Perkins Transactions 1, 1991, pp. 627-633.
Kato, et al., Macromolecules, 28, 1721 (1995).
Kawaguchi, et al., "Dispersion Polymerization", in Polymer Particles, Masayoshi Okubo, ed., Adv. Polym. Sci., 2005, 175, 299-328.
Kizhnyaev et al., Vinyltetrazoles: Synthesis and Properties, Russian Chemical Reviews, 2003, pp. 143-164, vol. 72(2).
Kolb et al., Click Chemistry: Diverse Chemical Function from a Few Good Reactions, Angewandte Chemie, International Edition, 2001, pp. 2004-2021, vol. 40(11).
Kosower, E.M., Acc Chem. Res. (1971), 4, 193-198.
Kowalewski et al., Advances in Nanostructured Carbons from Block Copolymers Prepared by Controlled Radical Polymerization Techniques, in Controlled Radical Polymerization: From Synthesis to Materials, American Chemical Society Division of Polymer Chemistry, 2005, Chapter 21, pp. 295-310, vol. 944.
Kwak et al., "ARGET ATRP of methyl methacrylate in the presence of nitrogen-based ligands as reducing agents," Polym. Int. 2009, 58, 242-247.
Lazzari, et al., Macromolecular Chemistry and Physics (2005), 206, 1382-1388.
Leduc et al., J. Am. Chem. Soc. 1996, 118, 11111-11118.
Lee, et al., "Synthesis of carboxylic acid functionalized nanoparticles by reversible addition-fragmentation chain transfer (RAFT) miniemulsion polymerization of styrene", Polymer, Elsevier Science Publishers B.V., GB, vol. 46, No. 11, pp. 3661-3668 (2005).
Lewis, et al., Copolymerization VII, Copolymerization of Some Further Monomer Pairs, Apr. 1948, pp. 1527-1529.
Li, et al., "Highly ordered carbon nanotube arrays for electronics applications", Applied Physics Letters, 75 pp. 367-369 (1999).
Li, et al., ASC Polym. Preprints, 1995, 36(1), 469.
Lingane, "Interpretation of the Polarographic Waves of Complex Metal Ions," Chem. Rev. 1941, 29, 1.
Liu et al., "Poly(N-isopropylacrylamide) hydrogels with improved shrinking kinetics by RAFT polymerization", Mar. 22, 2006, Polymer Elsevier Science Publishers, B.V., GB, pp. 2330-2336.
Majoral et al., Dendrimers Containing Heteroatoms (Si, P, B, Ge, or Bi), Chemical Reviews, 1999, pp. 845-880, vol. 99(3).
Makino et al., Controlled Atom Transfer Radical Polymerizations of Methyl Methacrylate Under Micellar Conditions, Polymer Preprints, 1988, pp. 288-289, vol. 39(1).
Mao, et al., "Controlled polymerizations of 2-(dialkylamino)ethyl methacrylates and their block copolymers in protic solvents at ambient temperature via ATRP", Journal of Polymer Science, Part A Polymer Chemistry, 42(20), pp. 5161-5169 (2004).
Maraval et al., "Lego" Chemistry for the Straightforward Synthesis of Dendrimer, Journal of Organic Chemistry, 2003, pp. 6043-6046, vol. 68(15).
Mardare, et al., ACS Polymer Preprints 35(1), 778 (1994).
Mardare, et al., Macromolecules, 27, 645 (1994).
Mardare, et al., Polym. Prep. (ACS), 36(1), 700-701 (1995).
Marestin et al., Nitroxide Mediated Living Radical Polymerization of Styrene in Emulsion, Macromolecules, 1998, pp. 4041-4044, vol. 31(12).
Matsumoto, et al., Synth. Commun. (1985) 15, 515.
Matthews et al., Dendrimers—Branching out from Curiosities into New Technologies, Progress in Polymer Science, 1998, pp. 1-56, vol. 23.
Matyjaszewski ed., Controlled/"Living" Radical Polymerization. Progress in ATRP, NMP, and RAFT, in: ACS Symposium Ser., 2000, Chapter 19, Revers e Atom Transfer Radical Polymerization Using AIBN or BPO as Initiator, pp. 263-275.
Matyjaszewski et al., (Structural Control of Poly(Methyl Methacrylate)-g-poly(Lactic Acid) Graft Copolymers by Atom Transfer Radical Polymerization (ATRP). Macromolecules 2001, 34, 6243-6248.
Matyjaszewski et al., "Controlled/Living Radical Polymerization. Kinetics of the Homogeneous Atom Transfer Radical Polymerization of Styrene," J. Am. Chem. Soc., 1997, 119, 674-680.
Matyjaszewski et al., Atom Transfer Radical Polymerization, Chemical Reviews, 2001, pp. 2921-2990, vol. 101(9).
Matyjaszewski et al., Controlled/"Living" Radical Polymerization of Styrene and Methly Methacrylate Catalyzed by Iron Complexesl, Macromolecules, 1997, pp. 8161-8164, vol. 30(26).
Matyjaszewski et al., Controlled/Living Radical Polymerization: State of the Art in 2002, in ACS Symposium Series, Advances in Controlled/living Radical Polymerizations, American Chemical Society Division of Polymer Chemistry, 2003, Chapter 1, pp. 2-9, vol. 854.
Matyjaszewski et al., Controlled/Living Radical Polymerization: State of the Art in 2005, in Controlled Radical Polymerization: From Synthesis to Materials, American Chemical Society Division of Polymer Chemistry, 2005, Chapter 1, pp. 2-12, vol. 944.
Matyjaszewski et al., Zerovalent Metals in Controlled/"Living" Radical Polymerization, Macromolecules, 1997, pp. 7348-7350, vol. 30(23).
Matyjaszewski, "The Importance of Exchange Reactions in the Controlled/Living Radical Polymerization in the Presence of Alkoxyamines and Transition Metals", Macromolecule Symposium, 1996, vol. 111, pp. 47-61.
Matyjaszewski, "Radical Nature of Cu-Catalyzed Controlled Radical Polymerizations (Atom Transfer Radical Polymerization)," Macromolecules, 1998, 31, 4710-4717.
Matyjaszewski, Controlled Radical Polymerization, American Chemical Society Division of Polymer Chemistry, 1998, ACS Symposium Series, Ch. 1, pp. 2-30. vol. 685.
Matyjaszewski, et al., Macromolecules 34, 5125 (2001).
Matyjaszewski, et al., Tetrahedron (1997), 53, 15321-15329.
McCarthy et al., Grafting Chromatographic Stationary Phase Substrates by Atom Transfer Radical Polymerization, in Controlled Radical Polymerization: From Synthesis to Materials, American Chemical Society Division of Polymer Chemistry, 2005, Chapter 18, pp. 252-268, vol. 944.
Min, et al, "Atom Transfer Radical Dispersion Polymerization of Styrene in Ethanol", Macromolecules, ACS, Washington, DC, US, vol. 40, No. 20, (Oct. 2, 2007), pp. 7217-7221.
Mitani, et al., J. Am Chem. Soc. 105, 6719 (1983).
Nagashima, J. Org. Chem. 57, 1682 (1992).
Nagashima, J. Org. Chem. 58, 464 (1993).
Navon, et al., Inorg. Chem. 1999, 38, 3484.
Nishikawa et al., Evidence for Living Radical Polymerization of Methyl Methacrylate with Ruthenium Complex: Effects of Protic and Radical Compounds and Reinitiation from the Recovered Polymers, Macromolecules, 1997, pp. 2244-2248, vol. 30(8).
Odell, et al., Macromolecules, 1995, 28, 8453.
Odian, Principles of Polymerization, Third Edition, John Wiley & Sons, p. 205-233 (1991).
Orochov et al., Redox-Transfer, Part VI, Determination of Hammet's P-Constant for the Oxidation of Cuprous Chloride by Aromatic Sulphonyl Chlorides, Journal of the Chemical Society (B), (1969), pp. 255-259.
Orochov, et al., J. Chem. Soc., Perkin II, 1000 (1973).
Orr, Thermochemical Aspects of Butadiene-Styrene Copolymerization, 1960, pp. 74-82.

Otsu, et al., Chem. Express 5(10), 801 (1990).

Otsu, et al., Synthesis, Reactivity, and Role of—Vinylbenzyl N,N-Diethyldithiocarbamate as a Monomer-Iniferter in Radical Polymerization, Macromolecules, 1986, pp. 287-290, vol. 19(2).

Pakuka et al., Polymers, Particles, and Surfaces with Hairy Coatings: Synthesis, Structure, Dynamics, and Resulting Properties, in ACS Symposium Series, Advances in Controlled/living Radical Polymerizations, American Chemical Society Division of Polymer Chemistry, 2003, Chapter 26, pp. 366-382, vol. 854.

Paoletti, et al., Inorg. Chem. 1967, 6, 64.

Paoletti, et al., Inorg. Chim. Acta Rev. 1973, 7, 43.

Patten et at, Atom Transfer Radical Polymerization and the Synthesis of Polymeric Materials, Advanced Materials, 1998, pp. 901-915, vol. 10(12).

Patten et al., Polymers with very Low Polydispersities from Atom Transfer Radical Polymerization, 1996, Science, pp. 866-868, vol. 272.

Percec et al., "Living" Radical Polymerization of Styrene Initiated by Arenesulfonyl Chlorides and $Cu^1(bpy)\eta CI$, Macromolecules, 1995, pp. 7970-7972, vol. 28(23).

Percec et al., Metal-Catalyzed "Living" Radical Polymerization of Styrene Initiated with Arenesulfonyl Chlorides. From Heterogeneous to Homogeneous Catalyses, Macromolecules, 1996, pp. 3665-3668, vol. 29(10).

Percec et al., Self-Regulated Phase Transfer of $Cu_2O$/bpy, Cu(0)/bpy, and $Cu_2O$(Cu(0)/bpy Catalyzed "Living" Radical Polymerization Initiated with Sulfonyl Chlorides, Macromolecules, 1998, pp. 4053-4056, vol. 31(12).

Pintauer et al., Toward Structural and Mechanistic Understanding of Transition Metal-Catalyzed Atom Transfer Radical Processes, in ACS Symposium Series, Advances in Controlled/living Radical Polymerizations, American Chemical Society Division of Polymer Chemistry, 2003, Chapter 10, pp. 130-147, vol. 854.

Punna et al., Click Chemistry in Polymer Synthesis, Polymer Preprints, 2004, pp. 778-779, vol. 45(1).

Puts, et al., Macromolecules, 1996, 29, 3323.

Qiu et al., Cyclic Voltammetric Studies of Copper Complexes Catalyzing Atom Transfer Radical Polymerization, Macromolecular Chemistry and Physics, 2000, pp. 1625-1631, vol. 201(14).

Queffelec et al., Optimization of Atom Transfer Radical Polymerization Using Cu(I)/Tris(2-(dimethylamino)ethyl)amine as a Catalyst, Macromolecules, 2000, pp. 8629-8639, vol. 33.

Quirk et al., Makromol. Chem., Macromol. Symp. 67, pp. 351-363 (1993), "Mechanistic Aspects of Group Transfer Polymerization".

Richard et al., Acrylate-Based Block Copolymers Prepared by Atom Transfer Radical Polymerization as Matrices for Drug Delivery Applications, in Controlled Radical Polymerization: From Synthesis to Materials, American Chemical Society Division of Polymer Chemistry, 2005, Chapter 17, pp. 234-251, vol. 944.

S.A.F. Bon et al., Controlled Radical Polymerization in Emulsion, Macromolecules, 1997, pp. 324-326, vol. 30(2).

Samuni et al., "On the cytotoxicity of vitamin C and metal ions," European Journal of Biochemistry, 1983, 137. 119-124.

Schubert et al., Design of Effective Systems for Controlled Radical Polymerization of Styrene: Application of 4,4'-Dimethyl and 5,5'-Dimethyl 2,2'-Bipyridine Copper(ii) Complexes, Macromolecular Rapid Communication, 1999, pp. 351-355, vol. 20.

Schulz & Milkovich, Relative Reactivities and Graft Distributions of Polystyrene Macromers in Vinyl Chloride Copolymerization, Polymer International, 1994, pp. 141-149, Great Britain.

Seijas, et al., Tetrahedron, 48(9), 1637 (1992).

Shen, et al., Supported Atom Transfer Radical Polymerization of Methyl Methacrylate Mediated by CuBr-Tetraethyldiethylenetriamine Grafted onto Silica Gel—Journal of Polymer Science: Part A: Polymer Chemistry, vol. 39, 1051-1059 (2001); John Wiley & Sons, Inc.

Srivastava, et al., J. Inorg. Nucl. Chem. (1980), 42, 47.

Stille et al., Synthesis and Copolymerization of Styryl-Substituted Tetrazoles. Thermal Cross-Linking of Copolymers Containing Dipolarophiles and the Tetrazoles as Nitrile Imine Dipole Precursors, Macromolecules, 1972, pp. 377-384, vol. 5(4).

Sumerlin et al., Click Functionalization of Well-Defined Copolymers Prepared by Atom Transfer Radical Polymerization, in Controlled Radical Polymerization: From Synthesis to Materials, American Chemical Society Division of Polymer Chemistry, 2005, Chapter 11, pp. 140-152, vol. 944.

Takeichi et al., Preparation of Porous Carbon Films by the Pyrolysis of Poly(Urethane-imide) Films and Their Pore Characteristics, Carbon, 2001, pp. 257-265, vol. 39(2).

Tang, et al., J. Am. Chem. Soc., 128, 1598-1604 (2006).

Tsarevesky et al., Factors Determining the Performance of Copper-Based Atom Transfer Radical Polymerization Catalysts and Criteria for Rational Catalyst Selection, in Controlled Radical Polymerization: From Synthesis to Materials, American Chemical Society Division of Polymer Chemistry, 2005, Chapter 5, pp. 56-70, vol. 944.

Tsarevsky et al., Well-Defined (Co)polymers with 5-Vinyltetrazole Units via Combination of Atom Transfer Radical (Co)polymerization of Acrylonitrile and "Click Chemistry"-Type Postpolymerization Modification, Macromolecules, 2004, pp. 9308-9313, vol. 37(25).

Udding, et al., J. Org. Chem. 59, 1993 (1994).

Van Gaal et al., "Trends in Redox Potentials of Transition Metal Complexes," Coord. Chem. Rev. 1982, 47, 41.

Veregin, et al., Macromolecules, 1996, 29, 4161.

Vidts, et al., "Design of water-soluble block copolymers containing poly(4-vinylpyridine) by atom transfer radical polymerization", European Polymer Journal, Pergamon Press Ltd, Oxford, GB, vol. 42, No. 1, pp. 43-50 (2006).

Vlcek, "Ligand Based Redox Series," Coord. Chem. Rev. 1982, 43, 39.

Von Werne, et al., Preparation of Structurally Well-Defined Polymer-Nanoparticle Hybrids with Controlled/living Radical Polymerizations—J. Am. Chem. Soc. 1999, 121, 7409-7410.

Wang, et al., "Living"/Controlled Radical Polymerization, Transition-Metal-Catalyzed Atom Transfer Radical Polymerization in the Presence of a Conventional Radical Initiator, Macromolecules, 1995, pp. 7572-7573, vol. 28.

Wang et al., Controlled/"Living" Radical Polymerization. Atom Transfer Radical Polymerization in the Presence of Transition-Metal Complexes, Journal of the American Chemical Society, 1995, pp. 5614-5615, vol. 117(20).

Wang et al., Controlled/"Living" Radical Polymerization. Halogen Atom Transfer Radical Polymerization Promoted by a Cu(I)/Cu(II) Redox Process, Macromolecules, 1995, pp. 7901-7910, vol. 28(23).

Wang et al., ESR Study and Radical Observation in Transition Metal-Mediated Polymerization: Unified View of Atom Transfer Radical Polymerization Mechanism, in ACS Symposium Series, Advances in Controlled/living Radical Polymerizations, American Chemical Society Division of Polymer Chemistry, 2003, Chapter 12, pp. 161-179, vol. 854.

Wang, et al., "Facile Synthesis of Acidic Copolymers Via Atom Transfer Radical Polymerization in Aqueous Media at Ambient Temperature", Macromolecules, ACS, Washington, DC, vol. 33, No. 2, (Jan. 25, 2000), pp. 255-257.

Wang, et al., J. Am. Chem. Soc. (1992), 114, 248-255.

Wang, et al., Polym. Prep. (Am. Chem. Soc. Polym. Chem. Div.), 36(1), 465 (1995).

Wayland, et al., Am. Chem. Soc., 116, 7943 (1994).

Webster, Living Polymerization Methods, Science, 1991, pp. 887-893, vol. 25.

Webster, Makromol. Chem., Macromol. Symp. 67, pp. 365-371 (1993), "Mechanism of GTP: Can all of the Available Data be Accommodated?".

Wei et al., Atom Transfer Radical Polymerization of Styrene in the Presence of Iron Complexes, Polymer Preprints, 1997, pp. 231, vol. 38(2).

Wu et al., Efficiency and Fidelity in a Click-Chemistry Route to Triazole Dendrimers by the Copper(I)-Catalyzed Ligation of Azides and Alkynes, Angewandte Chemie, International Edition, 2004, pp. 3928-3932, vol. 43(30).

Xia et al., Controlled/"Living" Radical Polymerization. Homogenous Reverse Atom Transfer Radical Polymerization Using AIBN as the Initiator, Macromolecules, 1997, pp. 7692-7696, vol. 30.

Xia, et al., "Atom Transfer Radical Polymerization of 4-Vinylpyridine", Macromolecules, pp. 3531-3533 (1999).

Zeng, et al., "Synthesis and Characterization of Comb-Branched Polyelectrolytes. 1. Preparation of Cationic Macromonomer of 2-(Dimethylamino)ethyl Methacrylate by Atom Transfer Radical Polymerization", Macromolecules, 33(5), pp. 1628-1635 (2000).
U.S. Appl. No. 09/534,827, filed Mar. 23, 2000, (not provided).
Gaynor et al., Macromolecules 1998, 31, 5951-5954.
Chambard et al., Macromol. Symp. 2000, 150, 45-51.
Li et al., Macromolecules 2004, 37, 2106-2112.
Min et al., J. Am. Chem. Soc. 2005, 127, 3825-3830.
Min et al., J. Polym. Sci., Part A: Polym. Chem. 2005, 43, 3616.
Antonietti et al., Macromolecules, 1991, 24: 6636-6643.
Feng et al., Gaofenzi Cailiao Kexue Yu Gongcheng; 2005, 21, 117-120.
Feng, et al., J. Appl. Polym. Sci., 2006, 99 1093.
Min et al., Macromolecules 2005, 38, 8131-8134.
Nicolas et al., Macromolecules 2005, 38, 9963-9973.
Ferguson et al., Macromolecules 2005, 38, 2191-2204.
Gilbert et al., Macromolecular Symposia 2006, 231, 84-93.
Chow et al., Adv. Polym. Sci. 2005, 175, 257-298.
Chow et al., Langmuir 1999, 15, 3202-3205.
El-Safty et al., Chem. Mater. 2005, 17, 3137-3145.
Stoffer et al., J. Polym. Sci. Polym. Chem. Ed. 1980, 18, 2641-2648.
Ferrick et al., Macromolecules 1989, 22, 1515-1517.
Kuo et al., Macromolecules 1987, 20, 1216-1221.
Jakubowski et al., Macromolecules 2005, 38, 4139-4146.
Antonietti et al., Macromol. Chem. Phys. 1995, 196, 441-466.
Guo et al., J. Polym. Sci., Part A: Polym. Chem. 1989, 27, 691-710.
Cramer, W. Proc. Chem. Soc. 1914, 30, 293.
Reiner et al., Baskerville Chemical Journal 1953, 4, 15-17.
Singh et al., Zeitschrift fuer Physikalische Chemie (Leipzig) 1957, 207, 198-204.
Parris et al., Discussions of the Faraday Society 1960, 240-247.
Weiss et al., Inorg. Chem. 1964, 3, 1344-1348.
Maeda et al., J. Adv. Polym. Sci. 2006, 193, 103.
Brown et al., Nature Rev. Cancer 2004, 4, 437.
Khelfallah et al., Macromolecular Rapid Communications 2006, 27, 1004-1008.
Huang et al., Biomarcomolecules 2005, 6, 2131-2139.
Houk et al., J. Am. Chem. Soc. 1987, 109, 6825.
Tsarevsky et al., Thesis CMU, 2005, Chapter 6.
Li et al., Angew Chem. Int. Ed. 2006, 45, 3510.
Li et al., Macromolecules 2006, 39, 2726.
Gao et al., Macromolecules 2005, 38, 5995.
Zelikin et al., Biomacromolecules Jul. 27, 2006.
Schafer et al., Free Radical Biol. Med. 2001, 30, 1191.
Medicinal Research Reviews, 2002, 22, 225-250.
Tsarevsky et al., "Combining Atom Transfer Radical Polymerization and Disulfide/Thiol Redox Chemistry: A Route to Well-Defined (Bio)degradable Polymeric Materials", Macromolecules, 2005, 38, 3087-3092.
Oh et al., "Inverse Miniemulsion ATRP: A New Method for Synthesis and Functionalization of Well-Defined Water-Soluble/Cross-Linked Polymeric Particles", Journal of the American Chemical Society, 2006, 128, 5578-5584.
Oh et al., "Biodegradable Nanogels Prepared by Atom Transfer Radical Polymerization as Potential Drug Delivery Carriers: Synthesis, Biodegradation, in Vitro Release, and Bioconjugation", Journal of the American Chemical Society, 2007, 129, 5939-5945.
Barrett, K.E. et al., J. Polym. Sci., Polym. Chem. Ed. 1969, 7, 2621.
Tseng, C.M. et al., J. Polym, Sc,. Part A: Polym. Chem. 1986, 24, 2995.
El-Aasser, M.S. et al., J. Polym. Sci., Part A: Polym. Chem. 1996, 34, 2633.
Kawaguchi et al., Adv. Polym. Sci., 2005, 175, 299.
LaMer, V.K. et al., J. Am. Chem. Soc. 1950, 72, 4847.
Yang, W. et al., J. Polym. Sci., Part A: Polym. Chem. 2001, 39, 555.
Song, J. et al., J. Am. Chem. Soc. 2004, 126, 6562.
Song, J. et al., Macromolecules 2005, 38, 8300.
Song, J. et al., 2006, 39, 8318-8325.
Hoelderle, M. et al., Macromolecules 1997, 30, 3420.
Gabaston et al., Macromolecules 1998, 31, 2883.
Shim, S.E. et al., S. Polymer 2003, 44, 5563.
Min, K. et al., "Development of an ab Initio Emulsion Atom Transfer Radical Polymerization: From Microemulsion to Emulson." J. Am. Chem. Soc. 2006, 128(32), 10521-10526.
Min, K. et al., "Atom Transfer Radical Dispersion Polymerization of Styrene in Ethanol" Polymer Preprints, 2007, 48 (2), 260-261.

* cited by examiner

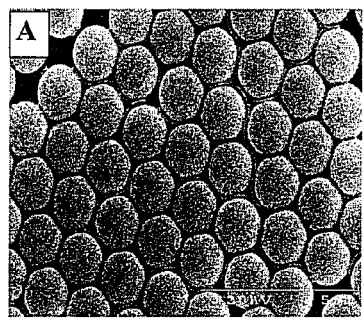
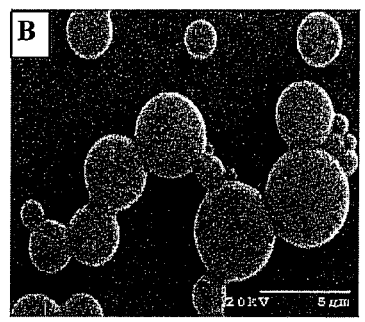
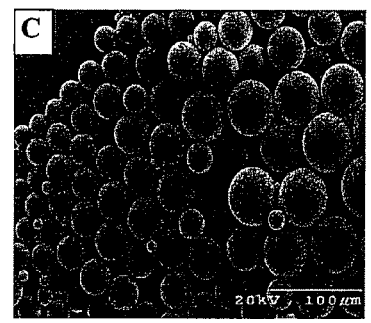
Fig. 1A                Fig. 1B                Fig. 1C
Fig. 2A                Fig. 2B
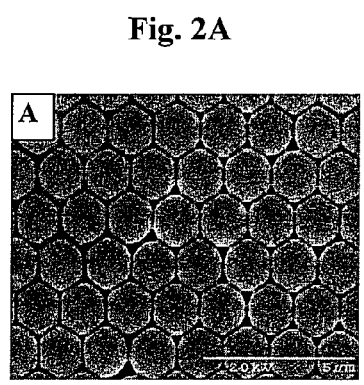
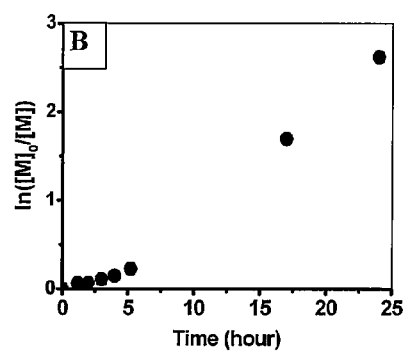
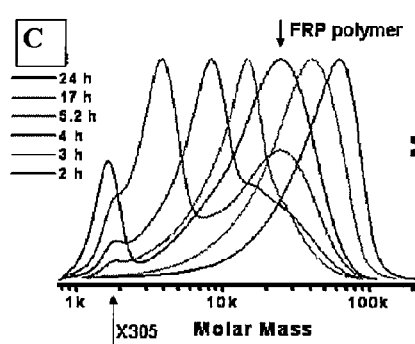
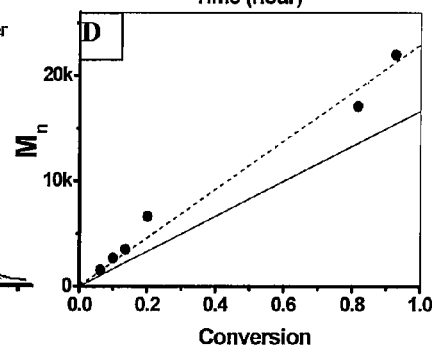
Fig. 2C                Fig. 2D

Fig. 5A (DP 530)      Fig. 5B (DP 265)      Fig. 5C (FRP, DP same as B)
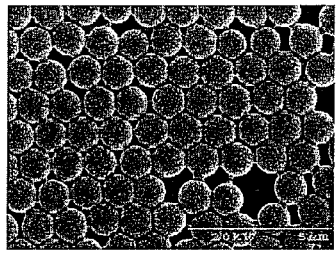 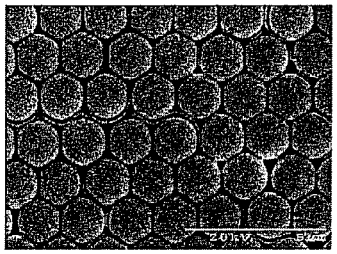 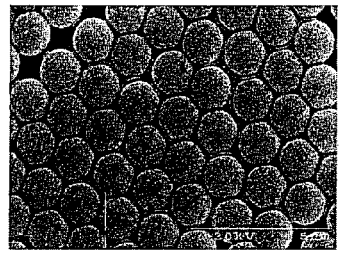
Fig. 5D (DP 160)      Fig. 5E (DP 100)
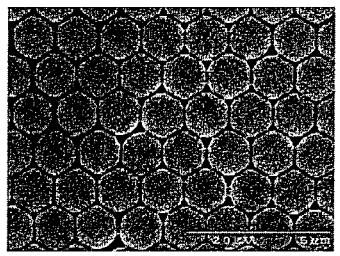 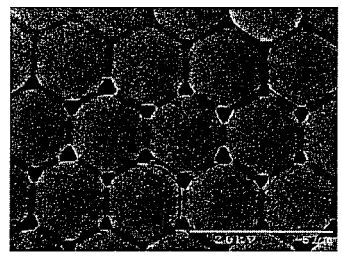
Fig. 6A      Fig. 6B
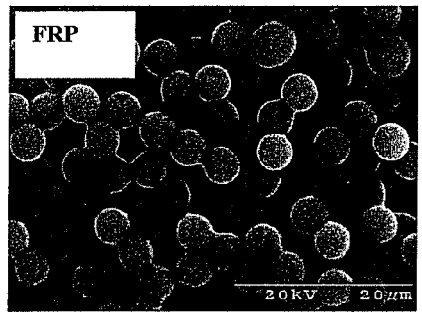 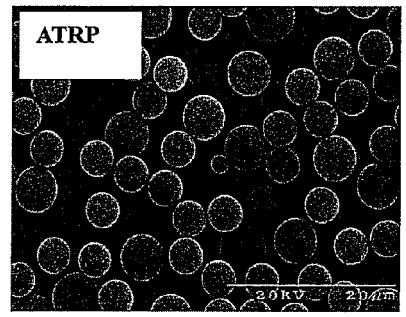

Fig. 7A
Fig. 7B
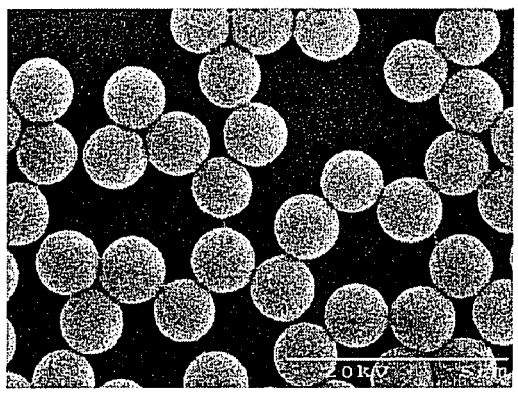
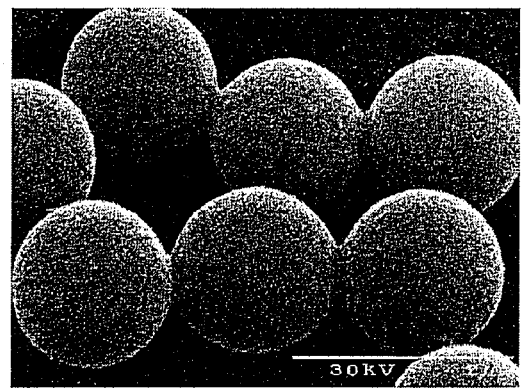

ATOM TRANSFER DISPERSION POLYMERIZATION

CROSS REFERENCE TO RELATED APPLICATIONS

This application is a nationalization of PCT International Application No. PCT/US2008/064710, having an international filing date of May 23, 2008, which claims the priority benefit of U.S. Provisional Application Ser. No. 60/931,472 filed May 23, 2007, the disclosures of each of which are incorporated herein by this reference.

GOVERNMENT INTEREST

Grant Statement

Financial support was provided by the NSF through grants CHE-04-05627 and 05-49353. Therefore the Government of the United States has certain rights in this invention.

TECHNICAL FIELD OF THE INVENTION

The scope of a living/controlled radical polymerization, such as an atom transfer radical polymerization (ATRP) has been expanded to allow preparation of uniform-sized polymer beads with diameters between 0.1-15 μm by defining conditions for an Atom Transfer Dispersion Polymerization (ATDP). A successful ATDP was accomplished by using a "two-stage" polymerization technique, in which the first stage involves a standard free radical polymerization and the second a living/controlled radical polymerization. Controlled addition of additional monomer, a second monomer, or a multifunctional monomer allows preparation of uniform size, functional, segmented, and/or crosslinked particles. Furthermore, use of a controlled/"living" radical polymerization allows retention of functionality suitable for post-polymerization modification of accessible particle surfaces.

BACKGROUND OF THE INVENTION

Polymer beads with substantially uniform sized diameters, between 0.5-10 μm, are finding an ever-increasing number of applications in coatings, electronics, microelectronics, biomedical, and information technology. Particle size control and narrow size distribution are key parameters for most of these applications. Several routes have been used to synthesize mono-disperse polymeric particles. One method is seeded suspension polymerization which uses uniform particles as seeds that are swollen with monomers prior to conducting polymerization. The other method is dispersion polymerization, which is generally recognized as a type of precipitation polymerization conducted in the presence of a suitable polymeric stabilizer that is soluble in the reaction medium. Under favorable circumstances dispersion polymerization, in a batch step process, results in the preparation of polymeric particles, often mono-disperse particles, of 0.1-15 μm in diameter.

Dispersion polymerization was initially developed employing a hydrocarbon medium in the 1970's [see, Barrett, K. E. J.; Thomas, H. R. *J. Polym. Sci., Polym. Chem. Ed.* 1969, 7, 2621]; however it was an extension of the procedure to encompass polar solvents, such as ethanol or methanol, that greatly expanded the utility of this polymerization procedure [see, Tseng, C. M.; Lu, Y. Y.; El-Aasser, M. S.; Vanderhoff, *J. W. J. Polym. Sci., Part A: Polym. Chem.* 1986, 24, 2995]. El-Asser later extended the procedure to living anionic dispersion polymerization in hydrocarbon solvents [see, El-Aasser, M. S.; et. al. *J. Polym. Sci., Part A: Polym. Chem.,* 1996; 34, 2633].

A dispersion polymerization is defined as a type of precipitation polymerization in which the monomer and all other reactants (including polymeric stabilizers) are initially soluble in the reaction medium, but the polymer is insoluble or substantially insoluble. Therefore a dispersion polymerization starts as a homogeneous solution polymerization but as polymer (or oligomer) chains grow in size they eventually reach a molecular weight higher than a certain critical value and precipitate from solution and aggregate to form colloidally unstable precursor particles. These particles coalesce and adsorb stabilizers from the reaction medium onto their surface until they become a colloidally stable dispersion of micelles in the reaction medium. At this point, the total number of particles in the system is fixed, and the nucleation stage ceases. Subsequent polymerization, also termed the particle growth stage, occurs predominantly inside the swollen nuclei or micelles but also in the reaction medium. However, the newly-formed polymers should not form additional nuclei but should be captured by existing particles [see, Kawaguchi, S.; Ito, K.; *Adv. Polym. Sci.,* 2005, 175, 299].

The reaction is easy to carry out, lends itself to scale up and yields particles with a very narrow and uniform particle size.

BRIEF SUMMARY

The present disclosure provides for a process for preparing substantially uniform-sized functional (co)polymer particles which utilizes a free radical polymerization process followed by a living or controlled radical polymerization process.

In one embodiment, the present disclosure provides a process for preparing substantially uniform-sized functional (co)polymer particles. The process comprises polymerizing at least one first radically (co)polymerizable monomer(s) by a free radical (co)polymerization process to form a (co)polymer in a reaction medium comprising a stabilizer and a non-aqueous polar solvent in which the (co)polymer is substantially insoluble; forming a stable colloidal dispersion comprising the (co)polymer dispersed in substantially uniform-sized micelles in the reaction medium; adding precursors for a controlled radical (co)polymerization system; and polymerizing the remaining first radically (co)polymerizable monomer(s) by a controlled radical (co)polymerization process to form substantially uniform-sized functional (co)polymer particles. In certain embodiments, the process may further comprising adding at least one additional radically (co)polymerizable monomer(s) after forming the stable colloidal dispersion.

According to other embodiments, the present disclosure provides for a continuous two-step batch dispersion polymerization process for the preparation of substantially uniform-sized functional polymer particles. The process comprises a first step comprising polymerizing at least one first radically (co)polymerizable monomer(s) by a free radical (co)polymerization process to form a (co)polymer in a stable colloidal dispersion and a second step comprising polymerizing the at least one first radically (co)polymerizable monomer(s) or an additional radically (co)polymerizable monomer(s) in the stable colloidal dispersion by a controlled radical (co)polymerization process to form substantially uniform-sized functional (co)polymer particles.

BRIEF DESCRIPTION OF THE DRAWINGS

The various embodiments of the present disclosure may be better understood when read in conjunction with the following Figures in which:

FIGS. 1A, 1B and 1C illustrate scanning electron microscope (SEM) images of polystyrene particles prepared by conventional dispersion polymerization (FIG. 1A), one-batch ATRP (FIG. 1B), and one-batch reverse ATRP (FIG. 1C), respectively. The scale bars in the images represent 5 μm, 5 μm and 100 μm respectively.

FIGS. 2A, 2B, 2C, and 2D illustrate SEM images of the polystyrene particle (FIG. 2A) prepared according to one exemplary set of conditions under the present disclosure; the polymerization kinetics (FIG. 2B); GPC traces of the obtained polymers during the polymerization process (FIG. 2C); and molecular weight evolution with monomer conversion (FIG. 2D); respectively. The scale bar in FIG. 2A represents 5 μm.

FIGS. 5A, 5B, 5C, 5D, and 5E illustrate SEM images showing variation in size of particles produced by various embodiments of the two-stage ATDP process as targeted degree of polymerization is reduced. The scale bars in the images represent 5 μm.

FIGS. 6A and 6B illustrate SEM images showing the particle size in dispersion polymerization of methyl methacrylate (MMA). FIG. 6A illustrates a free radical polymerization and FIG. 6B illustrates particles prepared by ATDP. The scale bars in the images represent 5 μm.

FIGS. 7A and 7B illustrate SEM images of poly-2-hydroxyethyl methacrylate (pHEMA)-modified crosslinked polystyrene particles. The scale bars represent 5 μm and 2 μm, respectively.

DETAILED DESCRIPTION

Figure 3A:
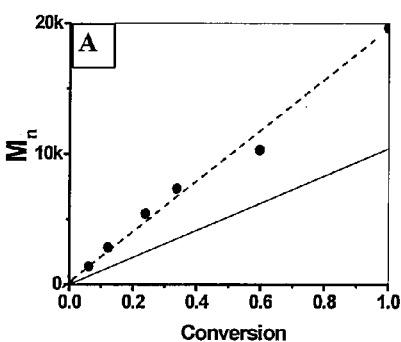
FIGS. 3A, 3B, 3C, and 3D illustrate the molecular weight evolutions (FIGS. 3A and 3B) and SEM images of polystyrene (PS) particles (FIGS. 3C and 3D) prepared by two embodiments of the two-stage atom transfer radical dispersion polymerization process of the present disclosure. The scale bars in the images represent 5 μm.

In dispersion polymerization processes, it has been widely accepted that the key issue for preparation of uniformly sized colloidal particles is a short nucleation stage [see, LaMer, V. K.; Dinegar, R. H. *J. Am. Chem. Soc.*, 1950, 72, 4847]. The particle number and particle number distribution are determined during the nucleation stage and no secondary particles or coagulum should be formed during the particle growth stage. A prolonged nucleation stage usually results in a broad particle size distribution.

Use of "Living" or Controlled Radical Polymerization (CRP) processes has not been successfully applied to a dispersion-type polymerization to form substantially uniform-sized functional (co)polymer particles. As used herein, the term "substantially uniform-sized" when used with reference to the size of the (co)polymer particles means that the (co)polymer particles have a size that varies by less than 10%, in certain embodiments less than 5%, and in specific embodiments less than 3%, when the diameters of more than 100 particles are measured. However, in a CRP, because all chains grow at the same rate, the time required for the preparation of a polymer with a molecular weight above the critical molecular weight of the reaction medium (i.e., the weight were the dispersion forms) is significantly longer than that in a FRP. Thus, this slower controlled radical polymerization process directly influences, most likely extends, the nucleation stage in a dispersion polymerization such that non-uniform particles are formed.

Furthermore, the nucleation stage in dispersion polymerization is very sensitive to variations in reaction components or conditions. It has been found that incorporation of functional monomers [Yang, W.; Yang, D.; Hu, J.; Wang, C.; Fu, S. *J Polym. Sci., Part A: Polym. Chem.* 2001, 39, 555] or crosslinking agents [Song, J.-S.; Tronc, F.; Winnik, M. A. *J. Am. Chem. Soc.* 2004, 126, 6562; Song, J.-S.; Winnik, M. A. *Macromolecules* 2005, 38, 8300] in a standard free radical dispersion polymerization is much more difficult than that in other heterogeneous polymerizations such as emulsion polymerization.

In recent years several living/controlled radical polymerization (CRP) techniques, which encompass (co)polymerization of a wide range of monomers in a spectrum of reaction media, have been developed. The development of a living/controlled radical dispersion polymerization would be a way to expand both the design and scope of functional polymer colloids. Combining dispersion polymerization and CRP offers several potential benefits in addition to the preparation of uniform micron-sized particles. For example, particles prepared by CRP techniques contain polymers with pre-determined chain-end functionality; therefore they are suitable materials for in situ, or for post-polymerization, modification of the particles forming materials that could be tailored for a spectrum of applications.

Since the particles obtained from a CRP can be designed to contain tele-functional lower molecular weight polymers that can be swollen by solvents or additional monomers, they are ideal materials for use as seeds for a seeded polymerization or for the preparation of higher molecular weight materials or segmented copolymer particles. Therefore, in principle, when CRP is applied to a dispersion polymerization, all chains are initiated quickly and grow simultaneously therefore uniform particle growth and good control over particle size would be anticipated from a living/controlled dispersion polymerization.

However, in previous efforts to apply CRP techniques to dispersion polymerization problems were encountered. For example, when using nitroxide mediated polymerization (NMP) [Hoelderle, M.; Baumert, M.; Muelhaupt, R. *Macromolecules* 1997, 30, 3420; Gabaston, L. I.; Jackson, R. A.; Armes, S. P. *Macromolecules* 1998, 31, 2883], degenerative transfer (DT) polymerization [Song, J.-S.; Winnik, M. A. *Macromolecules* 2006, 39, 8318-8325], and reversible addition-fragmentation transfer (RAFT) polymerization [Shim, S. E.; Jung, H.; Lee, H.; Biswas, J.; Choe, S. *Polymer* 2003, 44, 5563] as the CRP processes, polymers with controlled molecular weight and sufficient chain-end functionality have generally been obtained, however, particle size distribution was broad.

Furthermore, it was discovered that particle size uniformity, as well as the colloidal stability, declined as more radical control regulators (e.g. 2,2,6,6-tetramethylpiperidine-1-oxyl (TEMPO), DT, or RAFT agents) were added to the system. Particle size distribution was also broad in a recent PCT patent application, WO/2008/009997 [See, FIG. 1], disclosing dispersion polymerization employing a RAFT agent, even though a narrow particle size was claimed.

Therefore there is a need for a controlled radical polymerization process that can prepare uniform-sized polymer beads with particle size control and narrow size distribution that further allows retention of functionality suitable for post-polymerization modification of the particle surface.

This need is met with the disclosed adaptation of atom transfer radical polymerization (ATRP) to a dispersion polymerization system which involves a continuous two-step batch polymerization process wherein the first step comprises conducting a standard free radical polymerization of radically (co)polymerizable monomer(s) and the second step comprises an ATRP process.

As noted above, addition of control agents for a controlled polymerization process affects the nucleation process. We can confirm the sensitivity of the nucleation process to reaction components based on our initial attempts to combine atom transfer radical polymerization (ATRP) and dispersion polymerization. Mono-disperse particles could not be achieved in a single batch mode polymerization.

ATRP has been described in a series of patents and patent applications with Matyjaszewski as co-inventor and Carnegie Mellon University as assignee, including: U.S. Pat. Nos. 5,763,548; 5,807,937; 5,789,487; 5,945,491; 6,111,022; 6,121,371; 6,124,411; 6,162,882; 6,407,187; 6,512,060; 6,538,091; 6,541,580; 6,624,262; 6,624,263; 6,627,314; 6,790,919; 6,759,491; 6,887,962; 7,019,082; 7,056,455; 7,064,166; 7,125,938; 7,157,530; and 7,332,550 and U.S. and International PCT patent application Ser. Nos. 09/534,827; 09/972,056; 10/034,908; 10/269,556; 10/289,545; 10/638,584; 10/860,807; 10/684,137; 10/781,061, 10/992,249 11/059,217; 10/887,029; 11/430,216; 10/548,354; 11/593,185; PCT/US05/07264, PCT/US05/07265, and PCT/US06/33792, all of which are herein incorporated by reference, for example, to define which monomers can be (co)polymerized in an ATRP process and which ligands should be selected to provide stable active transition metal complexes in various media. ATRP has also been discussed in numerous publications and reviewed in several book chapters [see, *ACS Symp. Ser.*, 1998, 685; *ACS Symp. Ser.*, 2000; 768; *Chem. Rev.* 2001, 101, 2921-2990; *ACS Symp. Ser.*, 2003; 854; *ACS Symp. Ser.*, 2006; 944], the disclosures of which are incorporated in their entirety by reference herein. Within these published articles and book chapters similar polymerization systems employing of forming the four essential components required for an ATRP (Scheme 1) may be referred to by different names, such as transition metal mediated polymerization or atom transfer polymerization, but the processes are similar and referred to herein as "ATRP".

Any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

It should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of less than or equal to 10.

When a normal ATRP process was used for a dispersion polymerization, i.e. when Cu(I) species were added as the activators, nucleation (turbidity of the reaction system) was observed ~15 minutes after injection of ATRP initiators. This is visibly later than that in a conventional radical dispersion polymerization, in which nucleation occurred after ~5 min. under the similar reaction conditions.

When a reverse ATRP was used, i.e. ATRP deactivators species, Cu(II), were added together with a conventional radical initiator, such as AIBN, the observed nucleation was postponed even more.

The SEM images of polystyrene particles prepared in single step dispersion polymerizations using free radical polymerization (FRP), normal ATRP, and reverse ATRP are shown in FIG. 1. Comparing FIG. 1A with 1B and 1C, it is clear that particle size distribution broadened to a significant degree with the involvement of the components of an ATRP process in the reaction media, regardless of using direct or reverse ATRP initiation/activation. The presence of particles with a broad distribution of particle size, i.e., small and exceptionally large particles, indicates that both an extended initial nucleation stage and secondary nucleation (i.e., nuclei formed after the first nucleation stage) had occurred.

It is believed that in a CRP because all chains grow at the same rate, the time required for the preparation a polymer with a molecular weight above the critical precipitating molecular weight is significantly longer than that of a standard FRP, where high molecular weight polymer is formed almost immediately. This slower controlled polymerization process directly influences, most likely extends, the nucleation stage in a dispersion polymerization since the slow growing oligo/polymeric species take a longer time to attain a molecular weight above the critical value.

A successful dispersion polymerization requires that one shorten the nucleation stage in order to provide mono-disperse polymeric particles. It was determined that an ATRP system, such as a reverse ATRP system, could be modified to a two-step process to allow an uncontrolled free radical polymerization to occur to the extent required to seed the system (i.e., the nucleation step) prior to adding the reagents required for a controlled ATRP (see Scheme 2). The resulting two-step atom transfer dispersion polymerization provides substantially uniform-sized functional (co)polymer particles having well defined degree of polymerization, not previously accessible by FRP or CRP dispersion polymerization processes.

Scheme 1: Typical schematic of an ATRP equilibrium showing the four essential components: a transition metal that forms a stable complex with a ligand that exists in a lower (activator state) and higher (deactivator state) oxidation state to polymerize one or more radically (co)polymerizable monomer(s) wherein the majority of the chains are present in a dormant state comprising a transferable atom or group.

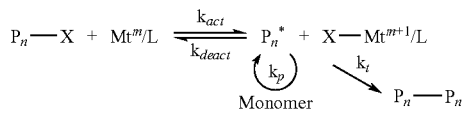

Scheme 2: "Two-stage" atom transfer dispersion polymerization

Step 1:

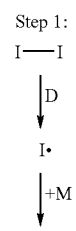

-continued

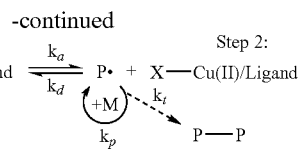

Step 2:

One difference between the initiation systems described in the present disclosure from that of a "classic" reverse ATRP is that the deactivator, the transition metal complex in its higher oxidation state, is added to the reaction at a certain time (~45 min) after the FRP polymerization was initiated. In this way, the first stage of the polymerization involves a standard FRP forming high molecular weight polymer, which should result in a short and clean nucleation stage, and improved uniformity in the size of the particles. In certain embodiments, the FRP polymerization for the nucleation step is allowed to proceed to less than 10% polymerization. In other embodiments, polymerization conversion after the nucleation period is complete in between 1% and 5% and continuing the polymerization to higher conversions leads to more stable particles.

The present disclosure describes several different features and aspects of the various exemplary embodiments provided herein. It is understood, however, that the present disclosure embraces numerous alternative embodiments, which may be accomplished by combining any of the different features, aspects, and embodiments described herein in any combination that one of ordinary skill in the art would find useful.

In the examples discussed below conversion in the first stage was less than 10% in order to ensure that the majority of the polymer chains retained an active chain end. Indeed in the examples, conversion of initially added monomers to polymer by FRP during nucleation was actually below ~3% when the copper complex was added to initiate the reverse ATRP reaction. In this manner the second stage should be an ATRP, during which time the polymers produced should exhibit the characteristics of a living/controlled polymerization process, i.e., pre-determinable molecular weight, narrow polydispersity, and retention of chain end functionality This novel in situ continuous batch two-stage reverse ATRP strategy efficiently resolved the problem of particle size uniformity. As seen in FIG. 2A, the particles formed in such a procedure had very narrow size distribution. In addition, comparing FIG. 1A and FIG. 2A, it can be seen that the particles prepared from free radical dispersion polymerization (FIG. 1A) and the new continuous two-step atom transfer radical dispersion polymerization (ATDP, FIG. 2A) have very similar particle size (1.50±0.05 nm and 1.54±0.05 nm, respectively). While not intending to be limited by any interpretation, this can be considered as proof that the nucleation stage was complete before addition of ATRP deactivators and the in situ formation of the dormant polymer chains and the lower oxidation state transition metal activator complex. According to this embodiment, the initiation system was still a reverse ATRP. A critical difference between the initiation systems applied and demonstrated for the first time in this research from that of a classic reverse ATRP is that the deactivator is added to the reaction at a certain time after the polymerization was initiated by a free radical initiator and after the nucleation procedure was complete.

Additional CRP initiation procedures developed for ATRP at Carnegie Mellon University, that also start with the oxidatively stable higher oxidation state catalyst complex, namely simultaneous reverse and normal initiation ATRP (SR&NI ATRP) [see, U.S. Pat. No. 6,759,491] and initiator for continuous activator regeneration (ICAR ATRP) [see PCT Application No. PCT/US06/33792] would also work, since in both these advanced procedures a standard free radical initiator is employed as part of the activation or reactivation procedure. These two procedures employ lower concentrations of the transition metal catalyst than a standard reverse ATRP and allow addition of an ATRP (macro)initiator to control the topology of the formed (co)polymer.

These procedures were also able to be modified to take into account the need to "seed" the dispersion polymerization prior to addition of the control agents. During the first stage the polymerization only involved a standard FRP forming a small fraction of high molecular weight polymer which should result in a short and clean nucleation stage, and improved uniformity in the size of the particles. After the nucleation stage is over, the precursors for the CRP, for example, the ATRP deactivators, i.e. Cu(II) species, and ATRP (macro)initiators, are added to the polymerization. Therefore the second stage should be a well controlled ATRP process during which time the polymers produced should exhibit all the characteristics of a living and controlled polymerization process. The term (macro)initiators indicates that the added ATRP initiators comprise either a low molecular weight initiator species or a higher molecular weight macroinitiator species and that the added (macro)initiator can comprise one or more initiating atoms or groups. Indeed, since the macroinitiators only participate in the ATRP stage of the polymerization, they can optionally be added to the first stage and the catalyst complex added alone in the second stage to be activated and initiate the second controlled polymerization. In other embodiments, the ATRP (macro)initiators may be formed in situ by reaction of a radical species with the ATRP catalyst involving transfer of the radically transferable atom or group from the transition metal catalyst to the radical.

The rate of an ATDP can be considerably slower than a conventional radical dispersion polymerization because of the addition and retention of ATRP deactivators during the second stage. For example in the ATDP's reported herein, the molecular weight of the polymers formed in the controlled polymerization steadily shifted towards higher value, demonstrating the retention of active chain-end functionality during the polymerization. The weight fraction of polymers formed during the first stage FRP nucleation process, became insignificant in the final polymer particles, as evidenced by the inconsequential fraction of the FRP polymer peak in the final GPC trace (see, FIG. 2C). The GPC trace of the final polymer formed during the reverse ATDP had tailing towards the low-MW area, which can be attributed to the slow decomposition of AIBN continuously forming new chains. The obtained polymer particles comprise polymers having a well defined molecular weight ~21,400 g/mol and relatively narrow polydispersity ($M_w/M_n$=1.6) characteristic of a CRP, compared with $M_w/M_n$=4-5 from conventional dispersion polymerization. Such tailing would be reduced in SR&NI ATDP and ICAR ATDP procedures and products with narrow or controlled PDI would be prepared since lower concentrations of free radical initiator are required.

In the initial standard reverse ATDP, the theoretical number-average molecular weight ($M_{n(theo)}$) was calculated based on the equation:

$$M_{n(theo)} = \frac{\Delta[M]}{2 \times f \times [AIBN]_0} M_m$$

in which f is the initiation efficiency of AIBN, which was assumed to be 75%, and $M_m$ refers to the molecular weight of the monomer. The initiation efficiency of this system is reflected in the ratio of experimental molecular weight to theoretical molecular weight. It was calculated to be ~70% (FIG. 2D).

The poor initiation efficiency may likely be due to:
1) an overestimated efficiency of the radicals formed by the decomposition of AIBN to initiate chain growth, and/or
2) coupling of oligomers in the initial stage of the ATRP, which reduces the number of living chains.

A lower concentration of free radical initiator should assist in attaining higher initiation efficiency, as indicated by the experiment targeting a higher degree of polymerization ($DP_{target}$).

Figure 3B:
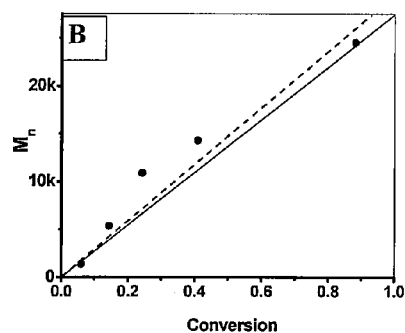
Figure 3C:
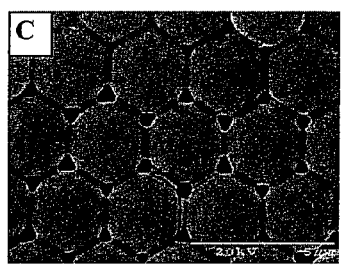
Figure 3D:

FIGS. 3A and 3B show evolution of molecular weight of the two systems with $DP_{target}$ of 100 and 260. It can be seen in the latter case that the initiation efficiency was very close to 100% while the procedure targeting a lower $DP_{target}$ of 100, resulted in initiation efficiency as low as ~53%. As the $DP_{target}$ decreased, i.e., the initiator concentration increased, the particle size increased (FIGS. 3C and 3D). This is a consequence of the higher initiator concentration which results in a higher concentration of growing oligo/polymers and a rate of the polymerization which was faster than the adsorption rate of the stabilizer. Therefore the oligo/polymers tended to aggregate and form larger nuclei before sufficient stabilizers were able to be adsorbed onto the particles to stabilize them. Therefore larger particles were obtained. This observation was confirmed when higher DP's of polymerization were targeted e.g. target DP of 530 resulted in a slower rate of initiator decomposition and the formation of particles with a size=1.17 µm.

In one embodiment of the present disclosure, this provides a procedure for preparation of larger particles with higher controllable molecular weight. In the initial stage conditions are selected to produce a lower $DP_{target}$, then once stable particles are formed and the control agents added a second, third or even later a fourth, aliquot of monomer is added to increase $DP_{target}$. Particle size can also be modified by selecting a free radical initiator that decomposes at a faster or slower rate at a given temperature.

Polymer particles with higher fractions of functional polymer chains arising from added ATRP initiator can be attained using SR&NI or ICAR. Indeed a modified activator regeneration by electron transfer ATRP (ARGET ATRP) procedure can also be applied. In this embodiment, the amount and composition of the free radical initiator is selected to allow for the preparation of stable particles in a rapid nucleation procedure but allow subsequent reactivation of the higher oxidation state ATRP catalyst complex by action of a reducing agent [see, PCT/US06/33792].

In a further embodiment of the present disclosure, this sequential addition of monomers can be employed to prepare block copolymers or blocky-gradient copolymers, if some of the first monomer is present when the second monomer is added [see, Min, K. et al. "Development of an ab Initio Emulsion Atom Transfer Radical Polymerization: From Microemulsion to Emulsion." *J. Am. Chem. Soc.* 2006, 128 (32), 10521-10526; and PCT Int. Appl. WO 2007/025086 for a discussion of emulsion ATRP processes for forming block/blocky-gradient copolymers, the disclosures of which are incorporated in their entirety by reference herein].

As noted in the background section the preparation of uniform crosslinked particles by dispersion polymerization is an additional significant challenge because of the sensitivity of the nucleation stage to the presence of crosslinking agents. Song and Winnik et al. reported some success using the two-stage technique to incorporate crosslinking agents into polystyrene particles in a conventional free radical dispersion polymerization [*Macromolecules* 2005, 38, 8300]. However, the report pointed out that when DVB was used as the crosslinking agent, the rapid consumption of DVB into the crosslinked system resulted in a low swelling ability of the growing particles/nuclei with monomers and therefore irregular-shaped particles. Furthermore, particle coagulation was observed when the concentration of DVB is higher than a critical value even when using the two-stage technique. A dispersion polymerization in the presence of 1 wt-% DVB resulted in severe coagulation after 2-3 hours. This phenomenon was also observed in our study (see, Table 2, run 2).

In order to overcome this limitation, we determined that it is advantageous to add fractions of the target amount of DVB multiple times. This novel stepwise addition of the comonomer responsible for crosslinking the particle resolved these stability problems in the disclosed CRP. In fact, using a periodic introduction of crosslinking agent can be beneficial for incorporation of higher concentrations of crosslinking agents into the CRP crosslinked system produced by the two-stage ATDP process. Because the overall lifetime of a growing polymer chain in a CRP is significantly longer than in a standard free radical polymerization, due to repetitive activation-deactivation cycles, the polymer chains have more time to relax during their dormant period resulting in the synthesis of a more uniform crosslinked structure. Thus, particles with a uniform crosslinked structure should swell more efficiently in the monomer/solvent system and therefore they should have less stability problems. Furthermore since the uniform crosslinking network can be swollen by added monomers, subsequent multiple additions of monomers can increase the particle dimensions and/or the porosity and adsorption properties of the uniform crosslinked particle. Indeed, additional monomers or crosslinkers can be added in a continuous manner to the reaction.

In one embodiment of the invention, exemplifying crosslinked particles are successfully prepared by using a two-stage ATDP, in which 1 wt-% of the crosslinking agent was added together with the second fraction of monomers and solvents. The particles remained stable after 24 hours, with monomer conversion ~95%. By varying the overall ratio of added/formed ATRP initiators to crosslinking agents (i.e., I to XL) it is possible to prepare particles comprising polymers with structures that vary in architecture from soluble branched structures to densely crosslinked networks [see, PCT Application PCT/US07/21684 for a discussion of the transition between a soluble branched structure and crosslinked networks].

Figure 4A:
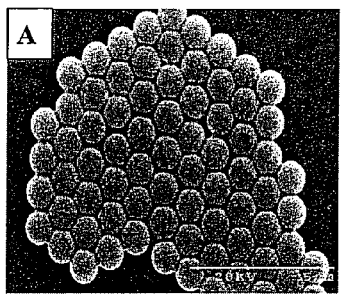
FIGS. 4A, 4B, and 4C illustrate SEM images of crosslinked PS particles prepared by two embodiments of the two-stage atom transfer radical dispersion polymerization at 8 h with monomer conversion 26% (FIG. 4A) and 24 h with monomer conversion 95% (FIGS. 4B and 4C), respectively. The scale bars in the images represent 5 μm, 5 μm and 2 μm, respectively.
Figure 4B:
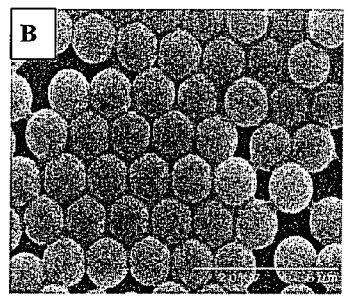
Figure 4C:
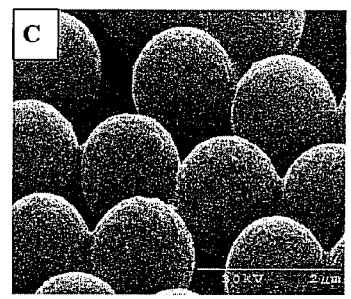

It is worth noting that polystyrene particles could only be clearly observed by SEM when the monomer conversion was higher than 50-60%. At low conversion the particles are so swollen with monomer and solvent that they form a film on the glass substrate and very soft, poorly defined SEM image would be anticipated. However, as FIG. 4A shows, even at the low monomer conversion of 26%, the particles targeting a crosslinked structure were already clearly imaged indicating that divinylbenzene (DVB) had been incorporated into the particles. The surface morphology of the particles was rather smooth at low monomer conversion (FIG. 4A), but became noticeably rougher when the conversion was higher (FIG. 4B), which can be clearly seen at higher magnification in FIG. 4C. Nevertheless, the particles remained spherical and monodisperse through the end of polymerization. The crosslinked particles can be easily filtered from the solvent and re-dispersed in a second medium.

One advantage of carrying out ATRP for the preparation of crosslinked particles is that the retained chain-end functionalities that can be directly used for further chain-extension and modification of the particle or particle surface. When using the particles from conventional dispersion polymerization processes, the initiators have to be further introduced and tethered to the accessible surfaces. This step can be avoided when using (co)polymer particles prepared directly by ATRP. It was envisioned that a sufficient number of accessible initiator functionalities should be available to allow the preparation of tethered copolymer chains providing functional surfaces in a porous particle or a functional tethered shell on a solid particle surface.

This embodiment of the process is exemplified by employing the first formed polystyrene particles as macroinitiators for chain-extension with 2-hydroxyethyl methacrylate (HEMA). Halide exchange technique was applied in this study considering the rate of cross-propagation from styryl radicals to methacrylate monomers. After the grafting from polymerization of HEMA, the particles can be dispersed in methanol, which indicates that the surface of the particles have been modified by successfully chain-extending accessible initiating functionality with poly(HEMA), since bare polystyrene particles cannot be dispersed in methanol. It can be seen from the SEM images that the surface of the modified polystyrene particles became smoother after p(HEMA) modification.

If the first formed crosslinked particles have been prepared in the presence of porogens to form crosslinked particles suitable for chromatographic applications then every accessible surface would have been modified in the grafting from (co)polymerization.

Therefore one embodiment of the invention an atom transfer radical dispersion polymerization is exemplified by the polymerization of styrene in ethanol which was successfully carried out using a continuous "two-stage" polymerization technique, in which the first stage involves a standard FRP and the second stage a reverse ATRP. Polystyrene particles with particle size of 1.5-2.5 µm were obtained. The particles prepared using the two-stage ATDP displayed narrow particle size distribution, contained polymers with molecular weight ~20,000 g/mol and relatively narrow, less than 2.0, polydispersity ($M_w/M_n$=1.4-1.8, compared with $M_w/M_n$=4-5 from conventional dispersion polymerization).

This novel ATDP technique also facilitated the preparation of uniform crosslinked particles wherein a crosslinkable monomer, such as a divinyl crosslinking agent, is added during the second or even in a third stage of the controlled polymerization process forming uniform particles. As a consequence of the involvement of ATRP and the option of addition of the crosslinking agent at the same time as the active components of the ATRP process or even periodic addition of the crosslinking agent as the reaction progressed, the ATDP process provides controlled incorporation of the crosslinking agent to form substantially uniform-sized crosslinked particles.

In addition, these crosslinked particles were successfully chain-extended with a second functional monomer, exemplified herein by HEMA, indicating well-retained accessible chain-end functionality on the accessible surface of the particles for further modification of particle surfaces thereby forming a core/shell structure allowing uniform dispersion of the first formed particles in polar solvents such as water and methanol, thereby exemplifying that the monomer(s) selected for the shell/surface polymerization can be selected to incorporate a desired functionality into the uniform particle.

Polymer particles of dimensions obtained from this process are finding an increasing number of applications in coatings, electronics, microelectronics, biomedical, and information technology. Particle size control and narrow size distribution are key parameters for most of these applications.

According to one embodiment, the present disclosure provides a process for preparing substantially uniform-sized functional (co)polymer particles. The process comprises polymerizing at least one first radically (co)polymerizable monomer(s) by a free radical (co)polymerization process to form a (co)polymer in a reaction medium comprising a stabilizer and a non-aqueous polar solvent in which the (co)polymer is substantially insoluble; forming a stable colloidal dispersion comprising the (co)polymer dispersed in substantially uniform-sized micelles in the reaction medium; adding precursors for a controlled radical (co)polymerization system; and polymerizing the remaining first radically (co)polymerizable monomer(s) by a controlled radical (co)polymerization process to form substantially uniform-sized functional (co)polymer particles.

As described herein, polymerizing the at least one first radically (co)polymerizable monomer(s) by a free radical (co)polymerization process to form a (co)polymer occurs in a first step of the ATDP process described herein. During this nucleation step, the formed (co)polymer is substantially insoluble in the non-aqueous polar solvent and, in the presence of stabilizers and optionally one or more co-stabilizer, forms a stable colloidal dispersion comprising the (co)polymer dispersed in substantially uniform-sized micelles in the reaction medium. Suitable stabilizers and co-stabilizers include surfactants, such as polymeric surfactants, nonionic surfactants, anionic surfactants, cationic surfactants, such as, but not limited to poly(N-vinylpyrrolidone) (PVP) and the TRITON® line of surfactants.

In certain embodiments, polymerizing the at least one first radically (co)polymerizable monomer(s) by a free radical (co)polymerization process occurs in a system initially comprising the stabilizer, a free radical initiator, the at least one first radically (co)polymerizable monomer(s), a non-aqueous polar solvent, and optionally the co-stabilizer. According to certain embodiments, the initial particle size, which may be determined by the size of the micelle formed during the nucleation, is controlled by an initial ratio of the free radical initiator to the concentration of the at least one radically (co)polymerizable monomer(s). Suitable free radical initiators include free radical initiators commonly used to initiate free radical polymerization reactions, such as, but not limited to peroxides and 2,2'-azobisisobutyronitrile (AIBN). Suitable free radical (co)polymerizable monomers include those commonly used in FRP type processes and known to those skilled in the art. Suitable non-aqueous polar solvents include, for example, but are not limited to, alcohols such as methanol, ethanol, propanol, and butanol.

In other specific embodiments, the solvent may additionally comprise a porogen. According to these embodiments, the resulting substantially uniform-sized functional (co)polymer particles may be porous particles.

In certain embodiments, the FRP nucleation process comprises initiating the polymerization in the presence of all of the at least one first radically (co)polymerizable monomer(s), whereas in other embodiments, only a portion of the at least one first radically (co)polymerizable monomer(s) are present in the solution when the FRP is initiated. For example, in specific embodiments, less than 10% of the at least one first radically (co)polymerizable monomer(s) may be polymerized by the FRP. In other embodiments, from 1% to 5% of the at least one first radically (co)polymerizable monomer(s)

may be polymerized by the FRP during the first step. As will be understood by one having skill in the art reading on the present disclosure, the extent of the FRP polymerization process may be determined by tailoring the reactivity of the FRP system or by the timing of the adding of the precursors for the controlled radical (co)polymerization system. For example, the precursors of the CRP may be added after free radical polymerization of less than 10% of the at least one first radically (co)polymerizable monomer(s) or after free radical polymerization of from 1% to 5% of the at least one first radically (co)polymerizable monomer(s).

According to certain embodiments, the processes of the present disclosures may further comprise adding at least one additional radically (co)polymerizable monomer(s) to the reaction after forming the stable colloidal dispersion and/or after adding the precursors for the controlled radical (co) polymerization. In these embodiments, the additional monomer(s) may migrate to the micelles and participate in the ATRP step of the two-stage process. In certain embodiment, the least one additional radically (co)polymerizable monomer(s) may be the same as the at least one first radically (co)polymerizable monomer(s). In these embodiments, the additional monomers may be incorporated into a homopolymer structure. In other embodiments, the least one additional radically (co)polymerizable monomer(s) may be the different from the at least one first radically (co)polymerizable monomer(s). In these embodiments, the resulting copolymers may be gradient, block, or blocky-gradient copolymers. For example, in certain embodiments adding the additional radically (co)polymerizable monomers may comprise one of adding the additional radically (co)polymerizable monomer(s) in a continuous manner and adding the additional radically (co) polymerizable monomer(s) in multiple addition stages.

Further, in other embodiments, the process may further comprise adding one or more additional amounts of a radically (co)polymerizable monomer(s) (which may be the same or different from the at least one first radically (co)polymerizable monomer(s) and/or the at least one additional radically (co)polymerizable (co)monomer(s)) to the process to continue the CRP process after polymerizing the additional radically (co)polymerizable monomer(s) by the CRP process. Thus, a multistage process may result in copolymers with well defined block structure, MW and degree of polymerization may be synthesized by the disclosed ATDP process. These embodiments take advantage of the capability of ATRP processes to control copolymer structure by selection of monomer structure. For example, in one embodiment, adding the one or more additional amounts of a radically (co)polymerizable monomer(s) may increase the degree of polymerization of the polymers in the particles by continuing the polymerization process. In certain embodiments, this allows control of the particle size (diameter), resulting in final particles with a larger or increased uniform sizes. In other embodiments, the characteristics of the polymer structure of the surface of the particle may be tailored by selection of the time of addition of and/or functionality of monomer units to control specific characteristics of the particle such as swelling, solubility and the like.

As recited herein, the second-step of the disclosed ATDP process comprises adding precursors for the controlled radical (co)polymerization system and polymerizing remaining first radically (co)polymerizable monomers by a controlled radical (co)polymerization process to form substantially uniform-sized functional (co)polymer particles. According to various embodiments, the controlled radical (co)polymerization process may be selected from atom transfer radical polymerization processes, including an initiation procedure comprising standard ATRP, reverse ATRP, simultaneous reverse and normal initiation ATRP (SR&NI ATRP), initiator for continuous activator regeneration ATRP (ICAR ATRP), and activator regeneration by electron transfer ATRP (ARGET ATRP). The various components of suitable precursor systems and initiation procedures for these ATRP processes are described in previous ATRP based patents by Matyjaszewski et al. For example, according to one embodiment, adding the precursors for the controlled radical (co)polymerization system may comprise adding a transition metal in a higher oxidation state comprising a radically transferable atom or group and a ligand that forms a complex with the transition metal. According to specific embodiments, the ligand/transition metal complex may be soluble in the substantially uniform-sized micelles in the reaction medium (solvent/monomer), such that the ligand/transition metal complex may migrate to the micelle. Once in the micelle, the ATRP polymerization of the remaining first radically (co)polymerizable monomer(s) and/or any additionally added radically (co)polymerizable monomer(s) may be initiated.

As described herein, certain embodiments of the presently disclosed processes may further comprise adding at least one cross-linkable monomer. According to these embodiments, the cross-linkable monomer may be incorporated into the copolymer structure and form cross-links between the developing polymer chains. These cross-links may then impart desired characteristics to the resulting copolymer particles. According to one embodiment, the at least one cross-linkable monomer may be added in a continuous manner in order to incorporate the targeted level of crosslinking units into the particle without inducing particle aggregation. In other embodiments the at least one cross-linkable monomer may be added in multiple addition stages. Specific examples of suitable cross-linkable monomers include radically cross polymerizable monomers having two or more radically reactive groups such as a plurality of carbon-carbon double or triple bonds. For example, in certain embodiments, the cross-linkable monomer may comprise a polyvinyl monomer, such as a divinyl monomer (for example, divinylbenzene (DVB)).

In specific embodiments of the disclosed dispersion polymerization process, the process may further comprise separating the substantially uniform-sized functional (co)polymer particles from the reaction medium and submitting the substantially uniform-sized (co)polymer particles to an atom transfer radical suspension polymerization process, wherein the substantially uniform-sized (co)polymer particles are used as a multifunctional macroinitiator for the ATRP process. This embodiment takes advantage of the fact that the (co)polymer particles formed by the ATDP process will have reactive functionality at the ends of the polymer chain ends (i.e., a transferable atom or group) that may react in further ATRP-type processes. Thus, the particles formed by the ATDP process disclosed herein may be further modified and/or functionalized by additional CRP processes or atom transfer radical addition (ATRA) processes.

According to the various embodiments of the present disclosure, the substantially uniform-sized functional (co)polymer particles formed by the disclosed two-step ATDP process may have an average particle size ranging from 0.1 µm to 15 µm. In other embodiments, the (co)polymer particles may have an average particle size ranging from 0.5 µm to 10 µm However, one skilled in the art will recognize that particles having uniform-size but larger size (i.e., greater than 15 µm) may be synthesized utilizing the ATDP synthesized particles as macroinitiators with further functionalization of the surface reactive atoms or groups by further ATRP processes.

Other embodiments of the present disclosure provide a continuous two-step batch dispersion polymerization process for the preparation of substantially uniform-sized functional (co)polymer particles. The process comprises a first step comprising polymerizing at least one first radically (co)polymerizable monomer(s) by a free radical (co)polymerization process to form a (co)polymer in a stable colloidal dispersion; and a second step comprising polymerizing the at least one first radically (co)polymerizable monomer(s) or an additional radically (co)polymerizable monomer(s) in the stable colloidal dispersion by a controlled radical (co)polymerization process to form substantially uniform-sized functional (co)polymer particles. As described herein, the stable colloidal dispersion may comprise the (co)polymer formed by the FRP process in substantially uniform-sized micelles dispersed in a reaction medium comprising a stabilizer and a non-aqueous polar solvent. Suitable initiation procedures for controlled radical (co)polymerization processes are described herein.

In specific embodiments, the second step of the two-step batch dispersion polymerization process may further comprise adding precursors for a controlled radically (co)polymerization system to the process. Suitable precursor systems are described herein. Other embodiments may further comprise adding one or more cross-linkable monomers, such as a divinyl monomer, as set forth herein.

The various non-limiting embodiments of the present two-step atom transfer dispersion polymerization process described herein will be better understood when read in conjunction with the following non-limiting examples.

EXAMPLES

Materials

All chemicals, including EBiB, bpy, CuBr, $CuBr_2$, poly(N-vinylpyrrolidone) (PVP, average $M_w$~55,000), TRITONS X-305 (octylphenol ethoxylate, 70%) were purchased from Aldrich, Milwaukee, Wis. and were used as received unless otherwise stated. Styrene (99%) and divinylbenzene (DVB, 80%) were purified by passing through a column filled with basic aluminum oxide to remove inhibitor and/or antioxidant and was stored at −5° C. 2,2'-Azobisisobutylronitrile (AIBN) was recrystallized in ethanol. Tripyridinemethyleneamine (TPMA) was synthesized according to the published procedures.

Example 1

Comparator 1

Conventional Radical Dispersion Polymerization

A 50-mL Schlenk flask was charged with ethanol, styrene (and DVB, if preparing crosslinked particles), stabilizer PVP, co-stabilizer TRITONS X-305 and initiator AIBN. Detailed recipes are listed in Table 1. The resulting homogenous solution was deoxygenated by bubbling with nitrogen at room temperature for 30 min. The flask was then placed in a 70° C. oil bath and stirred with a magnetic stirrer at ~100 rpm. The polymerization was stopped after 24 hours by cooling the flask to room temperature.

Comparator 2

One-Batch Atom Transfer Dispersion Polymerization of Styrene

The one-batch reactions were performed using the same procedure employed for the conventional radical dispersion polymerization, the only difference was addition of the components required for the ATRP together with the monomer and solvents. These examples provided particles with a broader distribution of particle size. The detailed recipes are listed in Table 1.

Example 1B

In the two-stage experiments, all of the stabilizer (PVP), the co-stabilizer (TRITONS X-305) and initiator (AIBN), and half of the monomer and ethanol were charged to a 50-mL Schlenk flask. The formed homogeneous solution was deoxygenated by bubbling nitrogen through the mixture at room temperature for 30 min. The flask was then placed in a 70° C. oil bath under magnetic stirring, ~100 rpm. $CuBr_2$ and TPMA were dissolved in a mixture of the remaining styrene and ethanol at 70° C. under nitrogen. This solution was added to the reaction after the polymerization had run for 45 min. Aliquots were withdrawn from the reaction at different time intervals to determine conversion by gravimetry. The samples were dried and dissolved in THF before being subjected to gel permeation chromatography (GPC) for molecular weight analysis. The polymerizations were stopped by exposing the catalysts to air.

TABLE 1

Process for the dispersion polymerizations of styrene in ethanol*

| Run | Initiation | First Stage $St_1$:AIBN:Ethanol$_1$:CuBr$_2$/TPMA (g) | Second Stage $St_2$:Ethanol$_2$:CuBr$_2$/TPMA (g) |
|---|---|---|---|
| 1 | FRP | 3.28:0.021:11:0 | |
| 2 | One-batch direct ATRP | 3.28:0:0.04(CuBr)/0.052:EBiB | |
| 3 | One-batch reverse ATRP | 3.28:0.021:11:0.04/0.052 | |
| 4 | Two-stage ATRP | 1.64:0.021:5.5:0 | 1.64:5.5:0.066/0.086 |
| 5 | Two-stage ATRP | 1.64:0.034:5.5:0 | 1.64:5.5:0.105/0.137 |
| 6 | Two-stage ATRP | 1.64:0.013:5.5:0 | 1.64:5.5:0.04/0.052 |

*PVP: 0.49 g, TRITON ® X305: 0.13 g, polymerization temperature: 70° C.

Characterization:

Monomer conversion was measured gravimetrically. Molecular weight and molecular weight distribution ($M_w$/$M_n$) were determined by GPC equipped with an autosampler (Waters, 717 plus), HPLC pump with THF as eluant at 1 mL/min (Waters, 515), and four columns (guard, $10^5$ Å, $10^3$ Å, and 100 Å; Polymer Standards Services) in series. Toluene was used as an internal standard. A calibration curve based on linear polystyrene standards was used in conjunction with a differential refractometer (Waters, 2410). Particle sizes and particle size distributions were examined by scanning electron microscopy (SEM, Hitachi S-2460N). SEM samples were prepared by drying a drop of diluted suspension on a clean microscope cover glass. The average particle size was based on measurement of 300 individual particles in the SEM images.

Example 2

Further examples targeting different degrees of polymerization (DP) were conducted and the result from examination of various initiator concentrations was: the size of particles decreased as the amount of initiator decreased. See FIG. 5. With a higher initial concentration of radicals the number of radicals present in the system increased and accordingly the rate of polymerization increased and the stabilizers were not able to quickly cover the surface of each proto-particle therefore the oligomers tended to aggregate and form larger nuclei and therefore larger particles are obtained. Similar reasoning would indicate that with a given initiator a larger particle size is also obtained at higher temperature.

Example 3

Atom Transfer Dispersion Polymerization of Styrene and a Crosslinker

Table 2 lists conditions for the copolymerization of a crosslinking agent with styrene.

Example 4

Chain Extension of Crosslinked Polystyrene Particles Prepared by ATRP Dispersion with 2-Hydroxyethyl Methacrylate (HEMA)

A direct ATRP of HEMA was carried out with crosslinked polystyrene particles as macroinitiators in DMF at 35° C. The crosslinked polystyrene particles were synthesized in a two-stage atom transfer radical dispersion copolymerization, and were separated from the ethanol suspension medium by centrifugation (5000 rpm, 20 min). The particles were washed with THF to remove any remaining monomer and dried under vacuum. A dispersion of the particles (0.2 g) in DMF (3.6 mL) was mixed with HEMA monomer (1.44 mL), and bpy (0.0185 g) then the mixture was subjected to five cycles of freeze-pump-thaw to remove oxygen. The reaction flask was then back-filled with nitrogen and CuCl (0.0056 g), $CuCl_2$ (0.0004 g) were added to the frozen mixture. The flask was sealed again and subject to vacuum followed by back-filling with nitrogen. The reaction flask was then placed in a 35° C. oil bath to conduct the polymerization. The polymerization was stopped after 40 hours by exposing the reaction mixture to air. The products were separated by centrifugation (5000 rpm, 20 min) and washed by methanol for several times.

TABLE 2

| | | Crosslinked Particles* | |
|---|---|---|---|
| Run | Initiation | First Stage $St_1$:AIBN:$Ethanol_1$:$CuBr_2$/TPMA (g) | Second Stage $St_2$:$Ethanol_2$:$CuBr_2$/TPMA (g) |
| 1 | Two-stage FRP | 1.64:0.013:6.3:0 | 1.64:6.3:0 (0.03 g DVB) |
| 2 | Two-stage ATRP | 1.64:0.013:6.3:0 | 1.64:6.3:0.04/0.052 (0.03 g DVB) |
| 3 | Two-stage ATRP | 1.64:0.013:6.3:0 | 1.64:6.3:0.04/0.052 (0.05 g DVB) |
| 4 | Two-stage ATRP | 1.64:0.013:6.3:0 | 1.64:6.3:0.04/0.052 (0.05 g DVB) |

*PVP: 0.49 g, TRITON ® X-305: 0.13 g, polymerization temperature: 70° C.

Runs 3 and 4 in Table 2 demonstrate the utility of adding fractions of the required amount of DVB multiple times to resolve these stability problems. Polystyrene particles were successfully prepared using a two-stage atom transfer radical dispersion polymerization, in which 1 wt-% DVB was added together with the second fraction of monomers and solvents. The particles remained stable after 24 hours, with monomer conversion ~95%. It is worth noting that the polystyrene particles can only be clearly observed in SEM when the monomer conversion was higher than 50-60%. At low conversion the particles are excessively swollen with monomer and solvent. They form a film on the glass substrate and a very soft SEM image would be anticipated. However, as FIG. 4A shows, even at the low monomer conversion (26%), the crosslinked particles were already clearly imaged, indicating DVB has been incorporated into the particles. The surface morphology of the particles was rather smooth at low monomer conversion (FIG. 4A), but noticeably rougher when the conversion was higher (FIG. 4B), which can be clearly seen with a high magnification in FIG. 4C. This increase in surface roughness has been also observed when conventional dispersion polymerization was carried out in the presence of crosslinking agents. In the present study, the particles remained spherical and monodisperse till the end of polymerization. The crosslinked particles can be easily dispersed in THF.

Example 5

PMMA Atom Transfer Dispersion Polymerization

MMA was also examined as a monomer for dispersion polymerization. It was determined that ethanol was not an appropriate dispersion medium for such system since PMMA has too high a solubility in ethanol. Thus methanol was selected. PVP was still used as stabilizer and no co-stabilizer was used in this system.

A free radical polymerization was first attempted. The rate of the polymerization was close to a 1st order reaction, however, the polymer showed a typical trend of molecular weight evolvement as in a free radical polymerization, and a broadening of MWD as conversion increased.

Two-step ATDP was then applied in this system. The kinetic plot looked very similar to that in FRP but the rate polymerization was considerably slower because of the effect of deactivation by Cu(II). The MWD of the obtained polymer was significantly narrower, close to 1.5.

FIG. 6, shows the PMMA particles from FRP and ATRP. The particles formed by ATDP under this initial set of conditions displayed slightly broader particle size distribution, which implies secondary nucleation, i.e. the nucleation stage was not finished when the second part of monomer/solvent/ATRP catalysts were added. Therefore, to improve such size control, a further-delayed addition of the components required to conduct the second step would be beneficial or higher DP should be targeted.

The invention claimed is:

1. A process for preparing substantially uniform-sized functional (co)polymer particles comprising:
   polymerizing at least one first radically (co)polymerizable monomer(s) by a free radical (co)polymerization process to form a (co)polymer in a reaction medium comprising a stabilizer and a non-aqueous polar solvent in which the (co)polymer is substantially insoluble;
   forming a stable colloidal dispersion comprising the (co)polymer dispersed in substantially uniform-sized micelles in the reaction medium;
   adding precursors for a controlled radical (co)polymerization system; and
   polymerizing remaining first radically (co)polymerizable monomer(s) by a controlled radical (co)polymerization process for form substantially uniform-sized functional (co)polymer particles.

2. The process of claim 1, further comprising adding at least one additional radically (co)polymerizable monomer(s) after forming the stable colloidal dispersion.

3. The process of claim 2, wherein the at least one additional radically (co)polymerizable monomer(s) are the same as the at least one first radically (co)polymerizable monomer(s).

4. The process of claim 2, wherein the at least one additional radically (co)polymerizable monomer(s) are different from the at least one first radically (co)polymerizable monomer(s).

5. The process of claim 1, further comprising adding at least one cross-linkable monomer.

6. The process of claim 5, wherein adding the at least one cross-linkable monomer comprises one of adding the at least one cross-linkable monomer in a continuous manner and adding the at least one cross-linkable monomer in multiple addition stages.

7. The process of claim 5, wherein the at least one cross-linkable monomer comprises a divinyl monomer.

8. The process of claim 1, wherein the controlled radical (co)polymerization process is an atom transfer radical polymerization (ATRP) with an initiation procedure selected from the group consisting of standard ATRP, reverse ATRP, simultaneous reverse and normal initiation ATRP (SR&NI ATRP), initiator for continuous activator regeneration ATRP (ICAR ATRP), and activators regenerated by electron transfer ATRP (ARGET ATRP).

9. The process of claim 1, wherein adding the precursors for the controlled radical (co)polymerization system comprises adding a transition metal in a higher oxidation state comprising a radically transferable atom or group and a ligand that forms a complex with the transition metal wherein the ligand/transition metal complex is soluble in the substantially uniform-sized micelles in the solvent.

10. The process of claim 1, wherein polymerizing at least one first radically (co)polymerizable monomer(s) by a free radical (co)polymerization process occurs in a system initially comprising:
    the stabilizer;
    a free radical initiator;
    the at least one first radically (co)polymerizable monomer(s);
    the solvent; and
    optionally a co-stabilizer.

11. The process of claim 10, wherein initial particle size is controlled by an initial ratio of the free radical initiator to the at least one first radically (co)polymerizable monomer(s).

12. The process of claim 2, wherein adding the additional radically (co)polymerizable monomer(s) comprises one of adding the additional radically (co)polymerizable monomer(s) in a continuous manner and adding the additional radically (co)polymerizable monomer(s) in multiple addition stages.

13. The process of claim 2, further comprising adding one or more additional amounts of a radically (co)polymerizable monomer(s) to the process to continue the controlled radical (co)polymerization process after polymerizing the additional radically (co)polymerizable monomer(s) by the controlled radical (co)polymerization process.

14. The process of claim 13, wherein adding the one or more additional amounts of a radically (co)polymerizable monomer(s) increases at least one of a degree of polymerization of the polymers of the particle and a final particle size.

15. The process of claim 13, wherein adding the one or more additional amounts of a radically (co)polymerizable monomer(s) comprises adding one or more additional amounts of a radically (co)polymerizable monomer(s) different from at least one of the at least one first radically (co)polymerizable monomer(s) and the additional radically (co)polymerizable monomer(s).

16. The process of claim 15, wherein the substantially uniform-sized functional (co)polymer particles comprise block copolymer particles or blocky-gradient copolymer particles.

17. The process of claim 1, further comprising
    separating the substantially uniform-sized functional (co)polymer particles from the medium; and
    submitting the substantially uniform-sized functional (co)polymer particles to an atom transfer radical polymerization process, wherein the substantially uniform-sized functional (co)polymer particles are used as a multifunctional macroinitiator for the atom transfer radical polymerization process.

18. The process of claim 1, wherein the solvent additionally comprises a porogen.

19. The process of claim 18, wherein the substantially uniform-sized functional (co)polymer particles are porous particles.

20. The process of claim 1, wherein the precursors for the controlled radical (co)polymerization system are added to the process after polymerizing less than 10% of the at least one first radically (co)polymerizable monomer(s) by the free radical (co)polymerization process.

21. The process of claim 1, wherein the precursors for the controlled radical (co)polymerization system are added to the process after polymerizing from 1% to 5% of the at least one first radically (co)polymerizable monomer(s) by the free radical (co)polymerization process.

22. The process of claim 1, wherein the substantially uniform-sized functional (co)polymer particles have an average particle size ranging from 0.1 µm to 15 µm.

23. A continuous two-step batch dispersion polymerization process for the preparation of substantially uniform-sized functional polymer particles comprising:
    a first step comprising polymerizing at least one first radically (co)polymerizable monomer(s) by a free radical (co)polymerization process to form a (co)polymer in a stable colloidal dispersion; and
    a second step comprising polymerizing the at least one first radically (co)polymerizable monomer(s) or an additional radically (co)polymerizable monomer(s) in the stable colloidal dispersion by a controlled radical (co)polymerization process to form substantially uniform-sized functional (co)polymer particles.

24. The process of claim 23, wherein the stable colloidal dispersion comprises the (co)polymer in substantially uniform-sized micelles dispersed in a medium comprising a stabilizer and a non-aqueous polar solvent.

25. The process of claim 23, wherein the controlled radical (co)polymerization process is an atom transfer radical polymerization (ATRP) with an initiation procedure selected from the group consisting of standard ATRP, reverse ATRP, simultaneous reverse and normal initiation ATRP (SR&NI ATRP), initiator for continuous activator regeneration ATRP (ICAR ATRP), and activators regenerated by electron transfer ATRP (ARGET ATRP).

26. The process of claim 23, wherein the second step further comprises adding precursors for a controlled radical (co)polymerization system to the process, the system comprising:
- a transition metal in a higher oxidation state comprising a radically transferable atom or group; and
- a ligand that forms a complex with the transition metal, wherein the ligand/transition metal complex is soluble in the substantially uniform-sized micelles.

27. The process of claim 23, further comprising:
adding a cross-linkable divinyl monomer.

* * * * *